(12) United States Patent
Narasimha et al.

(10) Patent No.: US 10,313,070 B2
(45) Date of Patent: Jun. 4, 2019

(54) FAST MILLIMETER-WAVE CELL ACQUISITION

(71) Applicant: Futurewei Technologies, Inc., Plano, TX (US)

(72) Inventors: Murali Narasimha, Vernon Hills, IL (US); George Calcev, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 131 days.

(21) Appl. No.: 15/343,093

(22) Filed: Nov. 3, 2016

(65) Prior Publication Data

US 2018/0123751 A1    May 3, 2018

(51) Int. Cl.
| | |
|---|---|
| H04W 4/00 | (2018.01) |
| H04L 5/00 | (2006.01) |
| H04W 24/08 | (2009.01) |
| H04W 76/10 | (2018.01) |
| H04W 16/28 | (2009.01) |
| H04W 48/00 | (2009.01) |

(Continued)

(52) U.S. Cl.
CPC ............ *H04L 5/0023* (2013.01); *H04L 5/006* (2013.01); *H04W 16/28* (2013.01); *H04W 24/08* (2013.01); *H04W 48/00* (2013.01); *H04W 76/10* (2018.02); *H04W 64/00* (2013.01); *H04W 88/08* (2013.01)

(58) Field of Classification Search
None
See application file for complete search history.

(56) References Cited

U.S. PATENT DOCUMENTS

| | | |
|---|---|---|
| 9,337,969 B2 | 5/2016 | Raghavan et al. |
| 2015/0325912 A1 | 11/2015 | Liu |
| 2015/0326359 A1 | 11/2015 | Subramanian et al. |

(Continued)

FOREIGN PATENT DOCUMENTS

| | | |
|---|---|---|
| WO | 2014009246 A1 | 1/2014 |
| WO | 2014036150 A1 | 3/2014 |

OTHER PUBLICATIONS

PCT/CN2017/105541, ISR, dated Dec. 28, 2017.

*Primary Examiner* — Kwang B Yao
*Assistant Examiner* — Juvena W Loo
(74) *Attorney, Agent, or Firm* — Vierra Magen Marcus LLP

(57) ABSTRACT

The disclosure relates to technology for assisting a wireless a communication device to acquire access to a millimeter-wave access point (mmW AP). In some embodiments, an angular direction from a mobile wireless communication device to the mmW AP is determined. In some embodiments, the mobile wireless communication device receives information from a wireless network that helps the mobile wireless communication device determine the angular direction. In some embodiments, the signals between wireless network and mobile wireless communication device are below 6 GHz. In some embodiments, the wireless network provides the mobile wireless communication device with the angular direction. Therefore, the mobile wireless communication device is able to configure an antenna to receive and/or transmit a beam in a direction of the mmW AP. The mobile wireless communication may do so during a process of gaining access to the mmW AP.

20 Claims, 28 Drawing Sheets

(51) Int. Cl.
 *H04W 88/08* (2009.01)
 *H04W 64/00* (2009.01)

(56) References Cited

U.S. PATENT DOCUMENTS

| | | |
|---|---|---|
| 2015/0358129 A1 | 12/2015 | Ryu et al. |
| 2016/0020876 A1 | 1/2016 | Raghavan et al. |
| 2016/0165605 A1* | 6/2016 | Dimou ................. H04B 7/0617 370/329 |
| 2016/0198474 A1 | 7/2016 | Raghavan et al. |
| 2016/0337916 A1* | 11/2016 | Deenoo .................. H04W 8/22 |
| 2017/0163331 A1* | 6/2017 | Breiling ............. H04B 7/15592 |

* cited by examiner

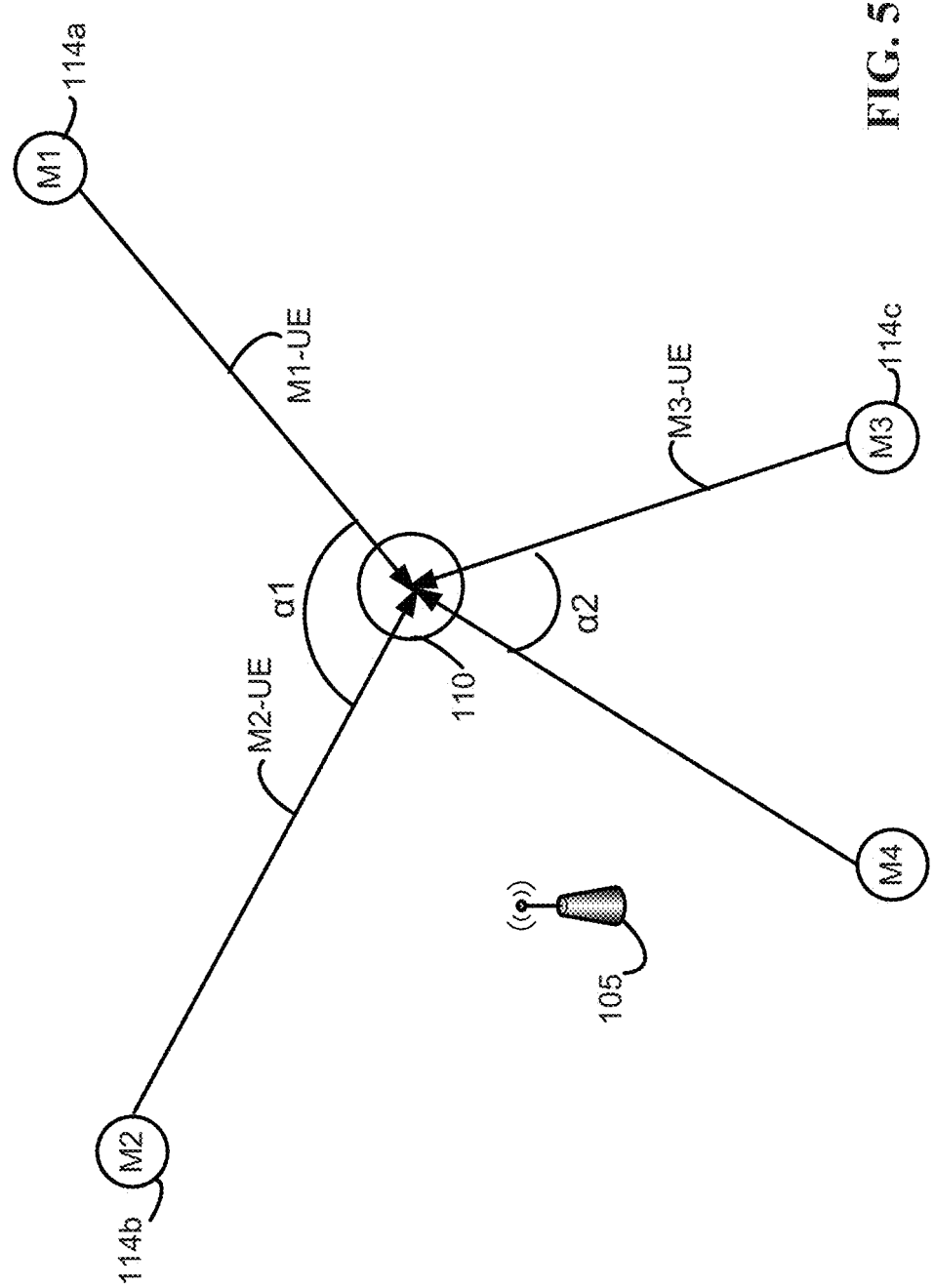

| | M1 | M2 | M3 | M4 | M5 | | m1 | m2 | m3 | m4 |
|---|---|---|---|---|---|---|---|---|---|---|
| 1 | -87.5 | -66 | -72 | -56 | -69 | | 47° | 220° | 93° | 22° |
| 2 | -97 | -61 | -88 | -101 | -73 | | 67° | 270° | 32° | 54° |
| 3 | -77 | -105 | -88 | -94 | -86 | | 289° | 220° | 52° | 46° |
| ... | ... | ... | ... | ... | ... | | | | | |
| n | -87.5 | -66 | -72 | -56 | -69 | | 77° | 20° | 34° | 59° |

|   | M1 | M2 | M3 | M4 | M5 |   | m1 | m2 | m3 | m4 |
|---|---|---|---|---|---|---|---|---|---|---|
| 1 | -87.5 | -66 | -72 | -56 | -69 |   | p11 | p12 | p13 | p14 |
| 2 | -97 | -61 | -88 | -101 | -73 |   | p21 | p22 | p23 | p24 |
| 3 | -77 | -105 | -88 | -94 | -86 |   | p31 | p32 | p33 | p34 |
| ⋮ | ⋮ | ⋮ | ⋮ | ⋮ | ⋮ |   |   |   |   |   |
| n | -87.5 | -66 | -72 | -56 | -69 |   | pn1 | pn2 | pn3 | pn4 |

FAST MILLIMETER-WAVE CELL ACQUISITION

BACKGROUND

Communication systems that utilize the millimeter-wave bands (e.g., 6 GHz to 100 GHz) are being designed as part of the ongoing 5G effort. Communication signals at such high frequencies are subject to very high path-loss. In order to overcome the high path-loss, it is necessary to use beam-forming techniques. Since beam-forming focuses transmitted energy into a narrow beam, only receivers within the angular span of the beam are able to receive the transmitted signal.

BRIEF SUMMARY

In first embodiment, there is a mobile wireless communication device, comprising a non-transitory memory storage comprising instructions and one or more processors in communication with the memory, wherein the one or more processors execute the instructions to perform the following. The one or more processors receive information that geometrically relates a set of base stations of a wireless network. The information comprises angular directions to a millimeter wave access point (mmW AP) from at least two of the base stations. The one or more processors determine a first angle between a first direction of arrival of a first signal from a first base station in the set and a second direction of arrival of a second signal from a second base station in the set. The one or more processors determine a second angle between a third direction of arrival of a third signal from a third base station in the set and a fourth direction of arrival of a fourth base station in the set. The one or more processors determine an angular direction from the mobile wireless communication device to the mmW AP, based on the information, the first angle, and the second angle.

In a second embodiment, and in accordance with the first embodiment, the angular direction from the mobile wireless communication device to the mmW AP is a candidate angular direction for two pairs of the base stations. Further the information geometrically relates other based stations of the wireless network and comprises angular directions to the mmW AP from the other base stations. Moreover, the one or more processors execute the instructions to select other two pairs of the base stations from the information; determine other candidate angular directions from the mobile wireless communication device to the mmW AP as was done for the pair of the first and second base stations and the pair of the third and fourth base stations; and determine a refined angular direction from the mobile wireless communication device to the mmW AP based on the candidate angular directions.

In a third embodiment, according to any one of the first and second embodiments the one or more processors execute the instructions to group the candidate angular directions into clusters of candidate angular directions; and select a value in a cluster with the most candidate angular directions as the refined angular direction.

In a fourth embodiment, according to any of the first through third embodiments, to determine the angular direction from the mobile wireless communication device to the mmW AP, the one or more processors execute the instructions to determine one or more candidate locations for the mobile wireless communication device based on the first angle being a first subtended angle and the second angle being a second subtended angle, and further based on the information that geometrically relates the first base station, the second base station, the third base station, and the fourth base station.

In a fifth embodiment, according to any of the first through fourth embodiments, the information that geometrically relates the base stations comprises a first distance between the first base station and the second base station, a second distance between the fourth base station and the third base station, wherein the first distance is a first chord associated with the first subtended angle and the second distance is a first second associated with the second subtended angle.

In a sixth embodiment, according to any of the first through fifth embodiments, the angular directions from the at least two base station to the mmW AP are with respect to a reference location to a reference location.

In a seventh embodiment, according to any of the first through sixth embodiments, the fourth base station is the same base station as the first base station.

In an eighth embodiment, according to any of the first through seventh embodiments, the first signal and the second signal are transmitted at a frequency below 6 GHz.

In a ninth embodiment, there is a mobile wireless communication device, comprising non-transitory memory storage comprising instructions, and one or more processors in communication with the memory. The one or more processors execute the instructions to perform the following. The one or more processors transmit a signal in response to a request from a wireless network. The one or more processors record an orientation of the mobile wireless communication device when the signal is transmitted. The one or more processors receive information from the wireless network that geometrically relates a first base station in the wireless network with a second base station in the wireless network, and comprises a first angular direction from the first base station to a millimeter wave access point (mmW AP) and a second angular direction from the second base station to the mmW AP. The one or more processors compute an angular direction from the mobile wireless communication device to the mmW AP based on the information and the orientation of the mobile wireless communication device when the signal was transmitted.

In a tenth embodiment, and in accordance with the ninth embodiment the one or more processors record an orientation of the mobile wireless communication device when the signal is transmitted, wherein the one or more processors compute the angular direction further based upon the orientation of the mobile wireless communication device when the signal was transmitted.

In an eleventh embodiment, according to any of the ninth through tenth embodiments, to compute the angular direction the one or more processors execute the instructions to compensate the angular direction based on a change in orientation of the mobile wireless communication device from the recorded orientation to a present orientation.

In a twelfth embodiment, according to any of the ninth through eleventh embodiments, the angular direction is a candidate angular direction for the first and second base stations. The information geometrically relates other base stations in the wireless network, and comprises angular directions from the other base stations to the mmW AP. The one or more processors execute the instructions to compute other candidate angular directions from the mobile wireless communication device to the mmW AP based on information for other pairs of base stations in the wireless network as was done for the first and second base stations; and determine a refined angular direction from the mobile wireless communication device to the mmW AP based on the candidate angular directions.

In a thirteenth embodiment, according to any of the ninth through twelfth embodiments the one or more processors execute the instructions to: group the candidate angular directions into clusters of candidate angular directions; and select a mean value in a cluster with the most candidate angular directions as the refined angular direction.

In a fourteenth embodiment, according to any of the ninth through thirteenth embodiments, the information that geometrically relates the first base station with the second base station comprises a distance between the first base station and the second base station, wherein the one or more processors execute the instructions to determine a candidate location for the mobile wireless communication device based on the distance between the first base station and the second base station.

In a fifteenth embodiment, according to any of the ninth through fourteenth embodiments, the signal is an uplink signal transmitted at a frequency below 6 GHz.

A sixteenth embodiment includes a method in a wireless network for providing a mobile wireless communication device with information to access a millimeter wave access point (mmW AP). The method comprises measuring a strength of a signal transmitted by the mobile wireless communication device at a set of base stations of the wireless network. The method further comprises accessing a table stored in non-transitory memory storage. The table has entries each of which maps reference signal strengths at the set of base stations to directional access information to access a mmW AP for the entry. The method further comprises comparing the strengths of the signal from the mobile wireless communication device received at the set of base stations to the table entries in order to determine directional access information for the mobile wireless communication device to access a selected mmW AP in the table. The method further comprises transmitting, from the wireless network to the mobile wireless communication device, the directional access information for the mobile wireless communication device to access the selected mmW AP in the table.

In a seventeenth embodiment, and in accordance with the sixteenth embodiment, the directional access information for the mobile wireless communication device to access the selected mmW AP comprises an angular direction from the mobile wireless communication device to the selected mmW AP.

In a eighteenth embodiment, according to any of the sixteenth through seventeenth embodiments, the directional access information for the mobile wireless communication device to access the selected mmW AP comprises beamforming parameters for the mobile wireless communication device to access the selected mmW AP.

In a nineteenth embodiment, according to any of the sixteenth through eighteenth embodiments, the method further comprises a) measuring strengths of sounding signals transmitted by a wireless device at the set of base stations of the wireless network; b) receiving an angular direction from the wireless device to a mmW AP to which the wireless device has access; c) repeating said a) and said b) for a plurality of wireless devices; and d) building a table that maps reference signal strengths to an angle at which to a mmW AP is located with respect to a reference.

In a twentieth embodiment, according to any of the sixteenth through nineteenth embodiments, the set of base stations are microwave base stations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 5F depicts a variation of FIGS. 5A-5E in which there is an additional base station M4.

FIG. 7A depicts an example table 700 of one embodiment of a database that maps reference signal strengths to an angular direction to mmW APs.

FIG. 7B depicts an example table 710 of one embodiment of a database that maps reference signal strengths to beamforming parameters to access mmW APs.

DETAILED DESCRIPTION

The disclosure relates to technology for assisting a wireless communication device to acquire access to a millimeter-wave access point (mmW AP). In some embodiments, an angular direction from a mobile wireless communication device to the mmW AP is determined. In some embodiments, the mobile wireless communication device receives information from a wireless network that helps the mobile wireless communication device determine the angular direction. In some embodiments, the signals between wireless network and mobile wireless communication device are below 6 GHz. In some embodiments, the wireless network provides the mobile wireless communication device with the angular direction. Therefore, the mobile wireless communication device is able to configure an antenna to receive and/or transmit a beam in a direction of the mmW AP. The mobile wireless communication may do so during a process of gaining access to the mmW AP.

Figure 1:
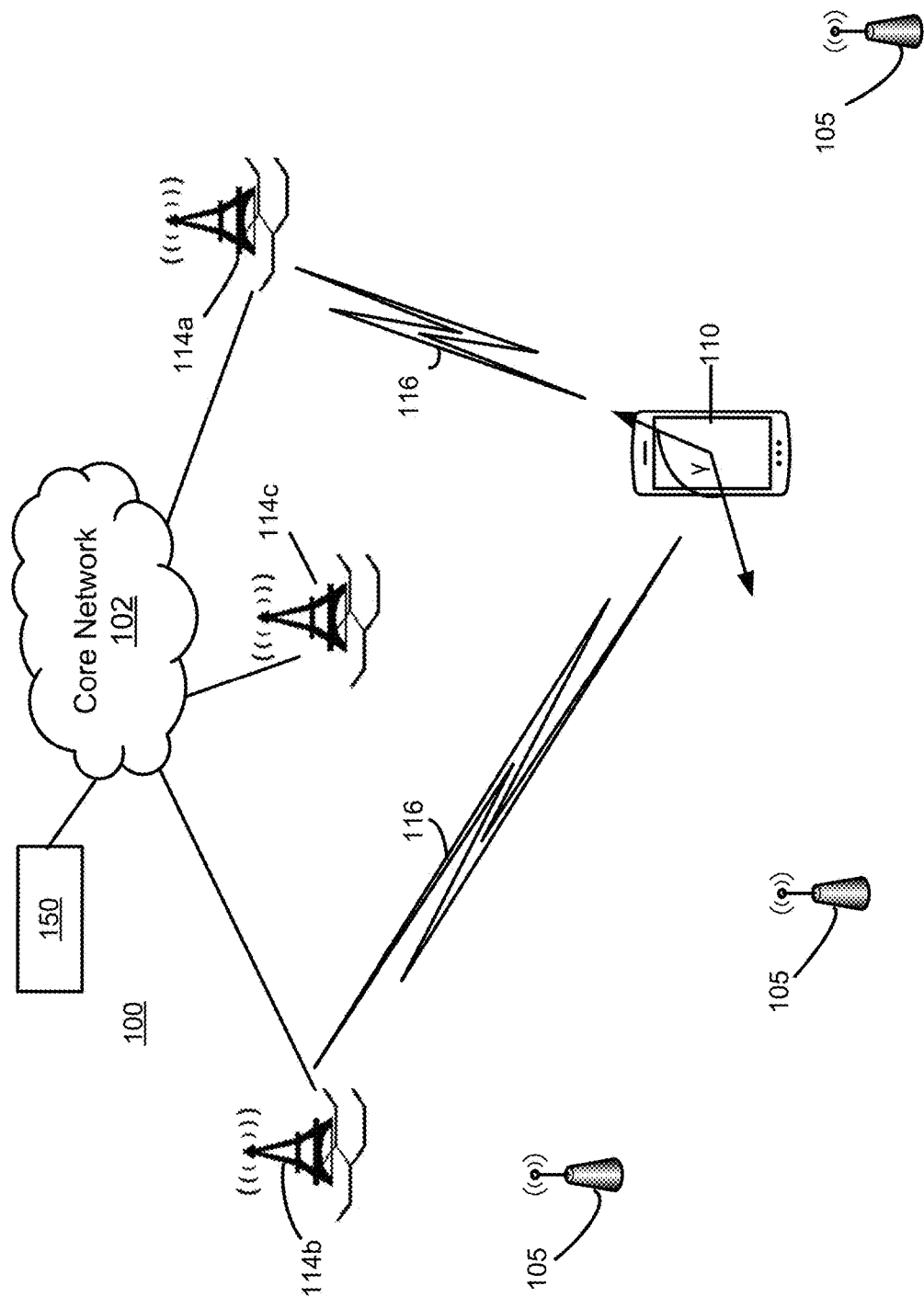
FIG. 1 illustrates an architecture of a wireless communication system in which the present technology may be implemented.

FIG. 1 illustrates an example communication system 100 in which embodiments may be practiced. As illustrated, the communication system 100 includes, but is not limited to, core wireless network 102, base stations 114, user equipment (UE) 110, and millimeter wave access points (mmW APs) 105.

The UE 110 may be configured to operate and/or communicate in the communication system 100. For example, the UEs 100 may be configured to transmit and/or receive wireless signals or wired signals. The UE 110 is able to communicate with both base stations 114 and mm mmW APs 105. The UE 110 may have a processor, a memory (which may or may not be non-transitory), a transceiver, and an antenna (not shown). In particular embodiments, some or all of the functionality described herein as being provided by the UE may be provided by the UE processor executing instructions stored on the memory. Alternative embodiments of the UE may include additional components that may be responsible for providing certain aspects of the UE's functionality, including any of the functionality necessary to support the embodiments of the present disclosure.

The UE 110 represents any suitable end user device and may include such devices (or may be referred to) as a user equipment/device (UE), mobile wireless communication device, wireless transmit/receive unit (WTRU), mobile station, fixed or mobile subscriber unit, pager, cellular telephone, personal digital assistant (PDA), smartphone, laptop, computer, touchpad, or consumer electronics device.

The core network 102 may include the hardware and software that provides a wireless network. For example, core network 102 may include one or more computer systems 150. The core network 102 may provide wireless communication to UE 110 in accordance with a wireless communication protocol. The core network 102 can include a collection of gateways through which wireless traffic passes. The core network 102 may be compliant with an evolved packet core (EPC). However, the core network 102 is not required to be EPC compliant. In one embodiment, the core network 102 includes a Serving Gateway (Serving GW), a Packet Data Network Gateway (PDN GW), a Mobility Management Entity (MME) and a Home Subscriber Server (HSS). However, it is not required to include these elements in the core network 102.

In general, the communication system 100 enables multiple wireless users to transmit and receive data and other content. The communication system may implement one or more channel access methods, such as code division multiple access (CDMA), time division multiple access (TDMA), frequency division multiple access (FDMA), orthogonal FDMA (OFDMA), or single-carrier FDMA (SC-FDMA).

Each base station 114 is configured to wirelessly interface with the UE 110 to enable access to the core network 102. Each base station 114 operates to transmit and/or receive wireless signals within a particular geographic region or area, sometimes referred to as a "cell." In some embodiments, multiple-input multiple-output (MIMO) technology may be employed having multiple transceivers for each cell.

The base stations 114 communicate with the UE 110 over one or more air interfaces 116 using wireless communication links. The air interfaces 116 may utilize any suitable radio access technology. In some embodiments, base stations 114 are configured to transmit and receive signals in a frequency below 6 GHz. The base stations 114 may also be able to transmit and receive signals in millimeter-wave bands (e.g., 6 GHz to 100 GHz). Thus, base stations 114 are configured to communicate with mmW APs 105, in some embodiments.

Each base station 114 may include one or more radio access nodes. For example, the base stations 114 may include one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

Together, the core network 102 and the base stations 114 are one embodiment of a wireless network.

It is contemplated that the system 100 may use multiple channel access functionality, including such schemes as described above. In particular embodiments, the base stations 114 and UE 110 are configured to implement the Long Term Evolution wireless communication standard (LTE), LTE Advanced (LTE-A), 5G and/or LTE Broadcast (LTE-B). The base stations and UE may be configured to implement LTE-unlicensed (LTE-U) or License assisted access LTE (LAA-LTE). The base stations and UEs may be configured to implement Wi-Fi. In other embodiments, the base stations and UEs are configured to implement UMTS, HSPA, or HSPA+ standards and protocols. Note that a mix of any of these schemes and wireless protocols may be used. Of course, other multiple access schemes and wireless protocols may be utilized.

The mmW APs 105 may include, but are not limited to, a connection point (a mmW CP) or a base station capable of mmW communication (e.g., a mmW base station). The mmWAPs 105 may transmit and receive signals in a frequency range, for example, from 6 GHz to 100 GHz, but are not required to operate throughout this range. Wireless communication signals in this range may suffer from high path loss. Beamforming may be used to overcome such losses. Beamforming focuses transmitted energy into a narrow beam. Both the mmW APs 105 and the UE 110 may use beamforming to communicate with each other. Also, the base stations 114 and the mmW APs 105 may use beamforming to communicate with each other. The mmWAPs 105, the UE 110, and at least some of the base stations 114 may have a phased-array beam antenna for beamforming. A transmitting and a receiving device can only communicate with each other when the phased array beam antennas of the transmitting and receiving device are mutually aligned.

Before establishing a communication link with a mmW AP 105, a UE 110 generally needs to perform cell acquisition and synchronization. The cell acquisition step typically involves receiving a synchronization signal from an access point (such as mmW AP 105). In a millimeter-wave band, beam-forming may be applied to synchronization signals (otherwise, the distance at which the synchronization signal can be received is much smaller than the distance at which the beam-formed data channels can be received). If the synchronization signals are beam-formed, only UEs 110 that are within the narrow angle covered by the beam are able to receive the synchronization signal. Thus, the mmW AP 105 may "beam-sweep" to ensure the UE 110 has a chance to receive the synchronization signal. Beam sweeping refers to rotating the direction of the beam to cover all directions. Moreover, the UE 110 may need to rotate the direction in which it searches for the synchronization signal in order for the phased-array beam antennas of the mmW AP 105 and UE 110 to be mutually aligned. Thus, the sweeping procedures can take a significant amount of time and introduce significant delays in the cell acquisition step.

The cell acquisition and synchronization becomes even more complicated if the UE 110 is moving, as the direction of arrival of the synchronization signal beam keeps changing. Also, the UE 110 may try to locate multiple mmW APs 105 to identify multiple cells suitable for service. Sweeping procedures to identify a group of mmW APs 105 can mean a substantial increase in the cell acquisition duration.

Embodiments disclosed herein provide technology that allows the UE 110 to quickly and efficiently access a mmW AP 105. In one embodiment, the UE 110 receives geometric assistance information from a base station 114 that helps the UE 110 determine an angular direction (γ) to a mmW AP 105. By "an angular direction" it is meant an angle defined by a line from the UE 110 to the mmW AP 105 with respect to some reference line, with the UE at the vertex of the angle. In the example of FIG. 1, the angular direction to the mmW AP 105 is defined based on an angle γ defined by a first line from the UE 110 to the mmW AP 105 and a second line from the UE 110 to base station 114a, with the UE 110 at the vertex of angle γ. However, the angular direction to the mmW AP 105 could be with respect to a reference line other than from the UE to base station 114a.

In one embodiment, the angle γ is calculated based on a direction of arrival of a signal between the UE 110 and a base station 114. In one embodiment, the angle γ is calculated based on a direction of arrival of a first signal from base station 114a at UE 110, and a direction of arrival of a second signal from base station 114b at UE 110. In one embodiment, the angle γ is calculated based on a direction of arrival of a signal from UE 110 that is received at base station 114a, and a direction of arrival of that same signal from UE 110 that is received at base station 114b.

In one embodiment, the calculation of the angle γ may be further based on information that geometrically links base station 114a and base station 114b. For example, the information may include a distance between base station 114a and base station 114b. The calculation of the angle γ may be further based on a first angular direction from the base station 114a to a mmW AP 105 and a second angular direction from the base station 114b to that same mmW AP 105.

In one embodiment, the calculation of the angle γ uses information that geometrically links base station 114a, base station 114b, and base station 114c. For example, the information may comprise a first distance between the base station 114a and base station 114b, a second distance between the base station 114a and base station 114c, and third distance between base station 114b and base station 114c. The information may further include a first angular direction from the base station 114a to a mmW AP 105 with respect to a reference location, and a second angular direction from base station 114b to the same mmW AP 105 with respect to the reference location. The reference location is a point somewhere in the same plane as the base stations 114, in one embodiment. The information may further include a fourth distance between the base station 114a and the reference location, a fifth distance between base station 114b and the reference location, and sixth distance between the base station 114c and the reference location, as well as location coordinates of the reference location.

One embodiment uses a fingerprinting technique to provide assistance to the UE 110 to access a mmW AP 105. To assist in this fingerprinting technique, the wireless network may have a table stored in non-transitory memory storage that has entries, each of which maps reference signal strengths at a set of base stations 114 to directional access information to access a mmW AP for the entry. The reference signal strengths may be derived from when a UE 110 was connected to a mmW AP 105. For example, when a UE 110 is connected to a mmW AP 105, one or more base stations 114 may record a strength of a signal coming from the UE 110. The UE 110 may provide the wireless network with some directional access information such as an angular direction from the UE 110 to a mmW AP 105 or beamforming parameters for the UE 110 to access the mmW AP 105. By repeating this with many UEs 110 a database which maps reference signal strengths to directional access information to access a mmW AP can be constructed.

In one fingerprinting embodiment, a base station 114 in the wireless network requests that a UE 110 that is seeking access to a mmW AP 105 to transmit an uplink signal. The strength of the uplink signal is measured at various base stations 114 in the wireless network. The strengths of the uplink signal, as measured at various base stations, is compared to the reference signal strengths in the aforementioned table in order to determine directional access information for the UE 110 to access a selected mmW AP 105. The directional access information is then transmitted to the UE 110. For example, one of the base stations 114 transmits an angular direction (e.g., γ) from the UE 110 to the selected mmW AP. As another example, one of the base stations 114 transmits beamforming parameters for the UE 110 to access the selected mmW AP 105.

Although FIG. 1 illustrates one example of a communication system, various changes may be made to FIG. 1. For example, the communication system 100 could include any number of UEs 110, base stations 114, millimeter access points 105, or other components in any suitable configuration.

Figure 2A:
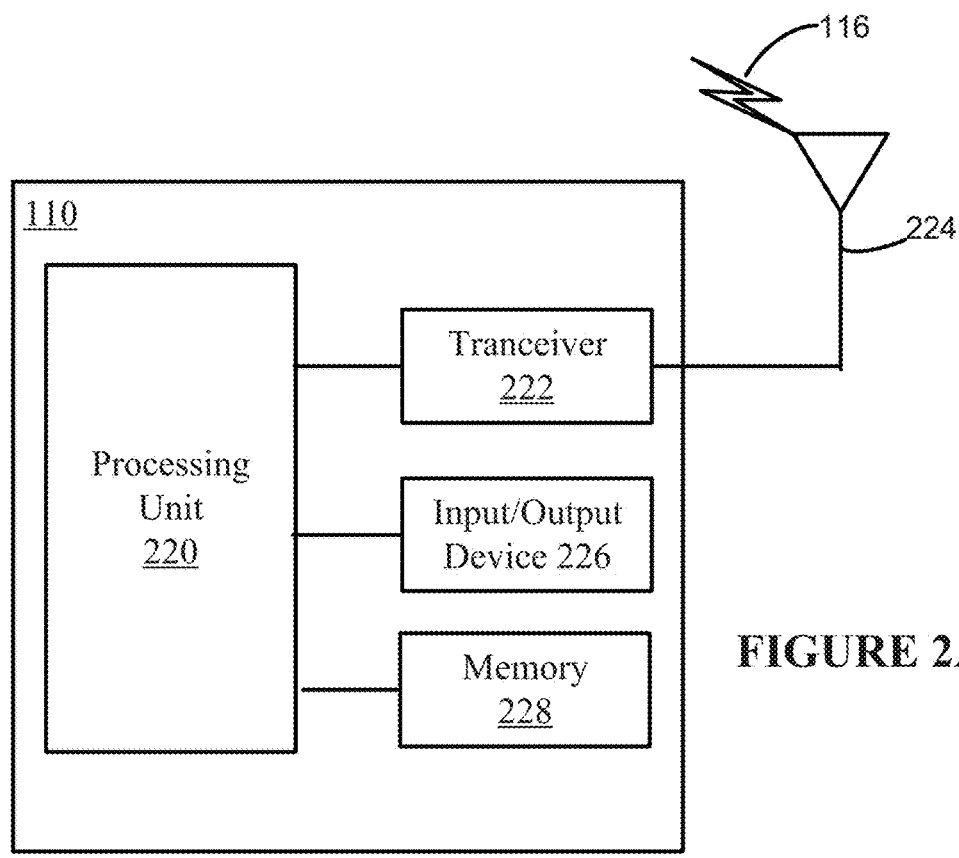
FIGS. 2A-2C illustrate example devices that may implement the methods and teachings according to this disclosure.

FIG. 2A depicts an example UE 110. As shown in FIG. 2A, the UE 110 includes at least one processing unit 220.

The processing unit 220 implements various processing operations of the UE 110. For example, the processing unit 220 could perform signal coding, data processing, power control, input/output processing, or any other functionality enabling the UE 110 to operate in the communication system 100. The processing unit 220 also supports the methods and teachings described in more detail herein. Each processing unit 220 includes any suitable processing or computing device configured to perform one or more operations. Each processing unit 220 could, for example, include a microprocessor, microcontroller, digital signal processor, field programmable gate array, or application specific integrated circuit.

The UE 110 also includes at least one transceiver 222. The transceiver 222 is configured to modulate data or other content for transmission by at least one antenna 224. The transceiver 222 is also configured to demodulate data or other content received by the at least one antenna 224. Each transceiver 222 includes any suitable structure for generating signals for wireless transmission and/or processing signals received wirelessly. Each antenna 224 includes any suitable structure for transmitting and/or receiving wireless signals. One or multiple transceivers 222 could be used in the UE 110, and one or multiple antennas 224 could be used in the UE 110. Although shown as a single functional unit, a transceiver 222 could also be implemented using at least one transmitter and at least one separate receiver.

The UE 110 may be configured to transmit and receive signals below 6 GHz (e.g., a microwave frequency range), as well as over mmW frequency range (e.g., 6 GHz to 100 GHz). When transmitting/receiving over the mmW frequency range, the UE 110 may be configured to perform beam forming. For example, antenna 244 may include a phased-array beam antenna.

The UE 110 further includes one or more input/output devices 226. The input/output devices 226 facilitate interaction with a user. Each input/output device 226 includes any suitable structure for providing information to or receiving information from a user, such as a speaker, microphone, keypad, keyboard, display, or touch screen.

In addition, the UE 110 includes at least one memory 228. The memory is non-transitory memory storage, in one embodiment. The memory 228 stores instructions and data used, generated, or collected by the UE 110. For example, the memory 228 could store software or firmware instructions executed by the processing unit(s) 220 and data used to reduce or eliminate interference in incoming signals. Each memory 228 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 2B:
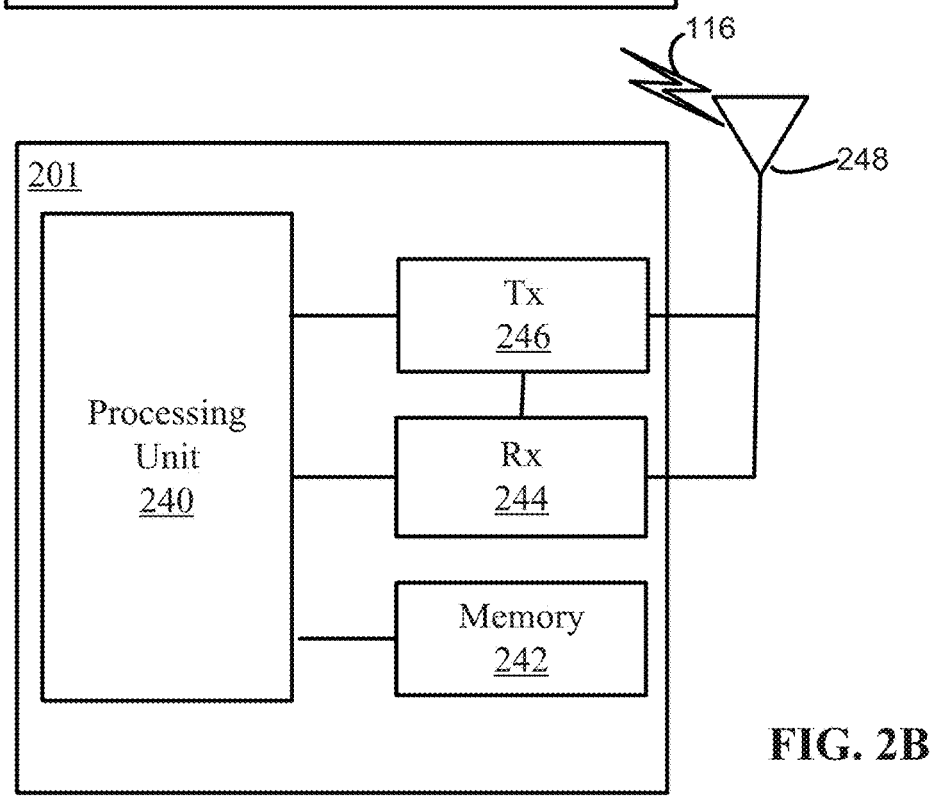

FIG. 2B illustrates an example wireless communication access device 201. The wireless communication access device 201 may be used to implement a base station 114 or mmW AP 105. These components could be used in the system 100, or in any other suitable system. As shown in FIG. 2B, the wireless communication access device 201 includes at least one processing unit 240, at least one transmitter 246, at least one receiver 244, one or more antennas 248, and at least one memory 242. The processing unit 240 implements various processing operations of the wireless communication access device 201, such as signal coding, data processing, power control, input/output processing, or any other functionality. The processing unit 240 can also support the methods and teachings described in more detail above. Each processing unit 240 includes any suitable processing or computing device configured to perform one or more operations. Each processing unit 240 could, for example, include a microprocessor, microcontroller, digital signal processor, field programmable gate array, or application specific integrated circuit.

Each transmitter 246 includes any suitable structure for generating signals for wireless transmission to one or more UEs or other devices. Each receiver 244 includes any suitable structure for processing signals received wirelessly from one or more UEs or other devices. Although shown as separate components, at least one transmitter 246 and at least one receiver 244 could be combined into a transceiver. Each antenna 248 includes any suitable structure for transmitting and/or receiving wireless signals. While a common antenna 248 is shown here as being coupled to both the transmitter 246 and the receiver 244, one or more antennas 248 could be coupled to the transmitter(s) 246, and one or more separate antennas 248 could be coupled to the receiver(s) 244. Each memory 242 includes any suitable volatile and/or non-volatile storage and retrieval device(s).

When used as a base station 114 in wireless network, the device 201 may be configured to transmit and receive signals below 6 GHz (e.g., a microwave frequency range), as well as over mmW frequency range (e.g., 6 GHz to 100 GHz). When transmitting/receiving over the mmW frequency range, the device 201 may be configured to perform beam forming. For example, antenna 248 may include a phased-array beam antenna.

When used as a mmW AP 105, the device 201 may be configured to transmit and receive signals in the mmW range (e.g., 6 GHz to 100 GHz). When transmitting/receiving over the mmW frequency range, the device 201 may be configured to perform beam forming. For example, the device 201 may have a phased-array beam antenna.

Figure 2C:
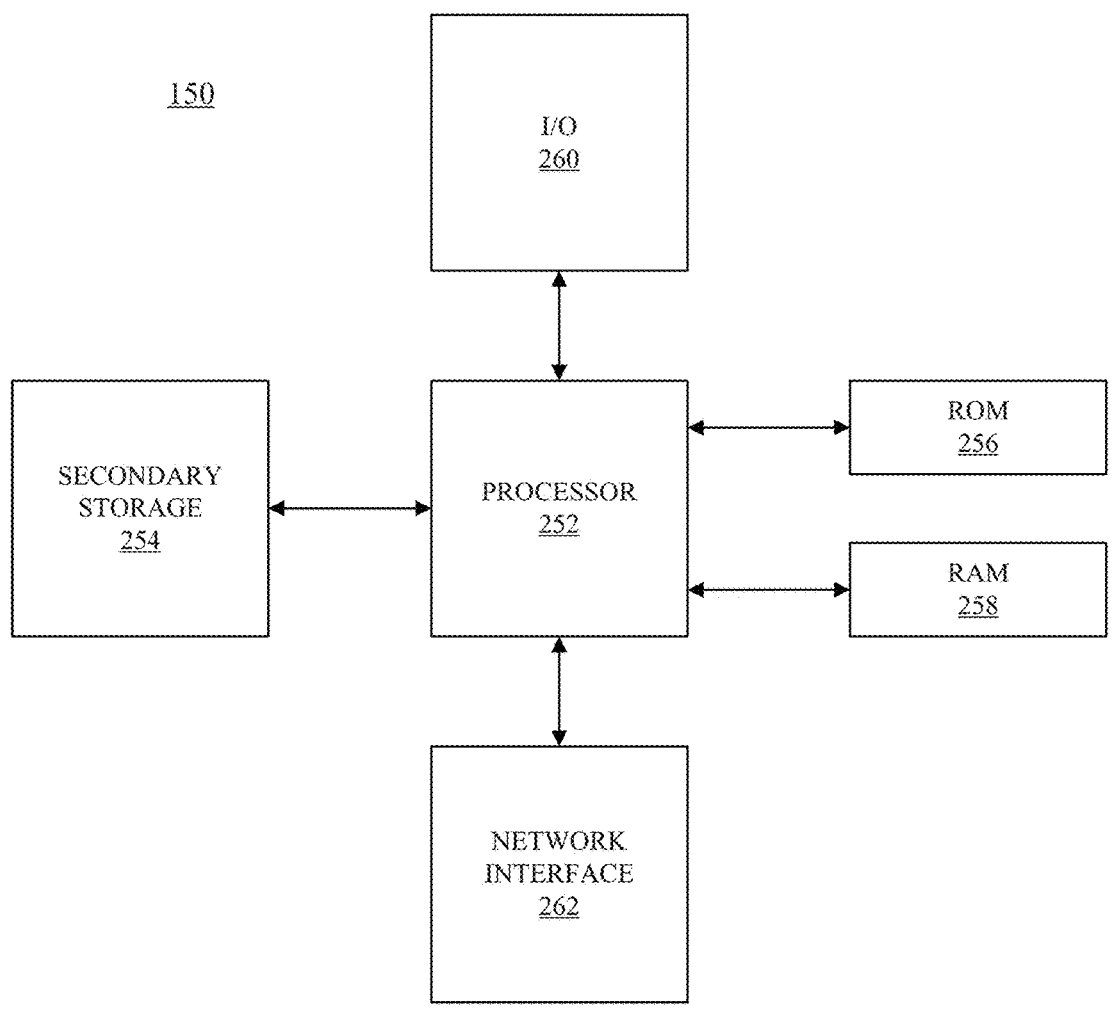

FIG. 2C illustrates a schematic diagram of a general-purpose network component or computer system 150. The general-purpose network component or computer system 150 includes a processor 252 (which may be referred to as a central processor unit or CPU) that is in communication with memory devices including secondary storage 254, and memory, such as ROM 256 and RAM 258, input/output (I/O) devices 260, and a network interface 262. Although illustrated as a single processor, the processor 252 is not so limited and may comprise multiple processors. The processor 252 may be implemented as one or more CPU chips, cores (e.g., a multi-core processor), FPGAs, ASICs, and/or DSPs, and/or may be part of one or more ASICs.

The secondary storage 254 is typically comprised of one or more disk drives or tape drives and is used for non-volatile storage of data and as an over-flow data storage device if the RAM 258 is not large enough to hold all working data. The secondary storage 254 may be used to store programs that are loaded into the RAM 258 when such programs are selected for execution. The ROM 256 is used to store instructions and perhaps data that are read during program execution. The ROM 256 is a non-volatile memory device that typically has a small memory capacity relative to the larger memory capacity of the secondary storage 254. The RAM 258 is used to store volatile data and perhaps to store instructions. Access to both the ROM 256 and the RAM 258 is typically faster than to the secondary storage 254.

Figure 3:
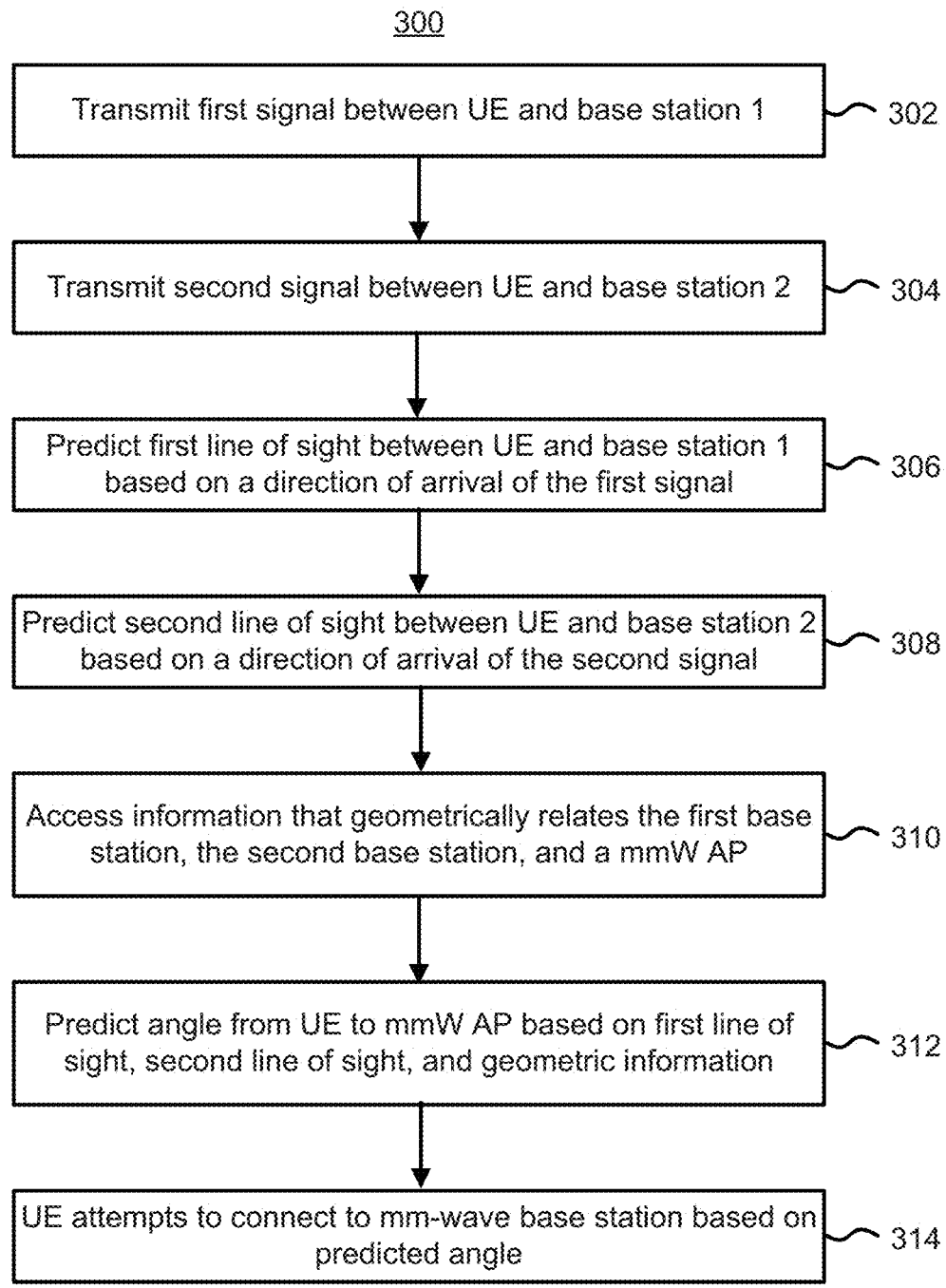
FIG. 3 is a flowchart illustrating one embodiment of a process of assisting a UE to access a mmW AP.

FIG. 3 is a flowchart illustrating one embodiment of a process 300 of assisting a UE 110 to access a mmW AP 105.

Reference will be made to the system 100 of FIG. 1 when discussing process 300; however, process 300 is not limited to system 100. Step 302 includes transmitting a first signal between a UE 110 and a first base station 114. For the sake of illustration, the first base station may be base station 114a. The signal may be transmitted either from the UE 110 to the base station 114a, or from the first base station 114a to the UE 110. In one embodiment, the UE 110 is a mobile wireless communication device.

Step 304 includes transmitting a second signal between the UE 110 and a second base station 114. For the sake of illustration, the second base station may be base station 114b. The signal may be transmitted either from the UE 110 to the base station 114b, or from the second base station 114b to the UE 110.

Step 306 includes predicting a first line of sight between the UE 110 and the first base station 114a, based on a measurement of the direction of arrival of the first signal. Step 306 is performed by the UE 110, based on a measurement of the direction of arrival of the first signal at the UE 110, in one embodiment. The prediction in step 306 is performed by the first base station 114a, based on a measurement of the direction of arrival of the first signal at the first base station 114a, in one embodiment. Alternatively, a computer system 150 in the wireless network may predict the first line of sight, based on the measurement of the direction of arrival of the first signal at the first base station 114a. Note that it is possible for the prediction of the line of sight to be incorrect of there is a reflection of the signal between the first station and the UE. If so, in some embodiments, a clustering of results (based on repeating the process with additional base stations) can be performed to eliminate cases in which the direction of arrival does not equal the line of sight.

Step 308 includes predicting a second line of sight between the UE 110 and the second base station 114b, based on a direction of arrival of the second signal. Step 308 is performed by the UE 110, based on a direction of arrival of the second signal at the UE 110, in one embodiment. Step 308 is performed by the second base station 114b, based on a direction of arrival of the second signal at the second base station 114b, in one embodiment. Alternatively, computer system 150 in the wireless network may predict the first line of sight, based on the direction of arrival of the second signal at the second base station 114b.

Step 310 includes accessing information that geometrically links the first base station 114a, the second base station 114b, and a mmW AP 105. In one embodiment, the information geometrically links a pair of base stations (e.g., base station 114a, 114b). In one embodiment, the information geometrically links a triple of base stations (e.g., base station 114a, 114b, 114c). In one embodiment, the information geometrically links two pairs of base stations.

In one embodiment step 312 includes predicting an angle to the mmW AP 105 based on the first line of sight, the second line of sight and the third line of sight to corresponding base stations in a triple of base stations. For example, the angle γ may be determined based on an angle α1 and an angle α2. The angle α1 is the angle defined by a line from the UE 110 to the base station 114a and the line from the UE 110 to the base station 114b. The angle α2 is the angle defined by a line from the UE 110 to the base station 114b and the line from the UE 110 to the base station 114c.

In a second embodiment, step 312 includes predicting an angle to the mmW AP 105 based on the first line of sight, the second line of sight, and the geometric information. For example, the angle δ may be defined by a first line from the UE 110 to the mmW AP 105 and a second line from the UE 110 to base station 114a, with the UE 110 at the vertex of angle δ. However, the angular direction to the mmW AP 105 could be with respect to a reference line other than from the UE to base station 114a. Step 312 may be performed by UE 110, a base station 114, or other computer system 150 in the wireless network.

In one embodiment, the predicted angle is a first candidate angle. Steps 302-312 of process 300 may be performed with other sets of base stations to generate other candidate angles. Note that the next set of base stations could include a base station previously used. For example, the next set could include base station 114a and base station 114c. A refined angle is determined based on the set of candidate angles.

Step 314 includes the UE 110 attempting to connect to the mmW AP 105 based on the predicted angle. In one embodiment, this is the refined angle based on multiple sets of base stations. Step 314 may include the UE 110 beamforming using a phased-array beam antenna. Step 314 may include the UE 110 attempting to receive a synchronization signal from the mmW AP 105.

Figure 4:
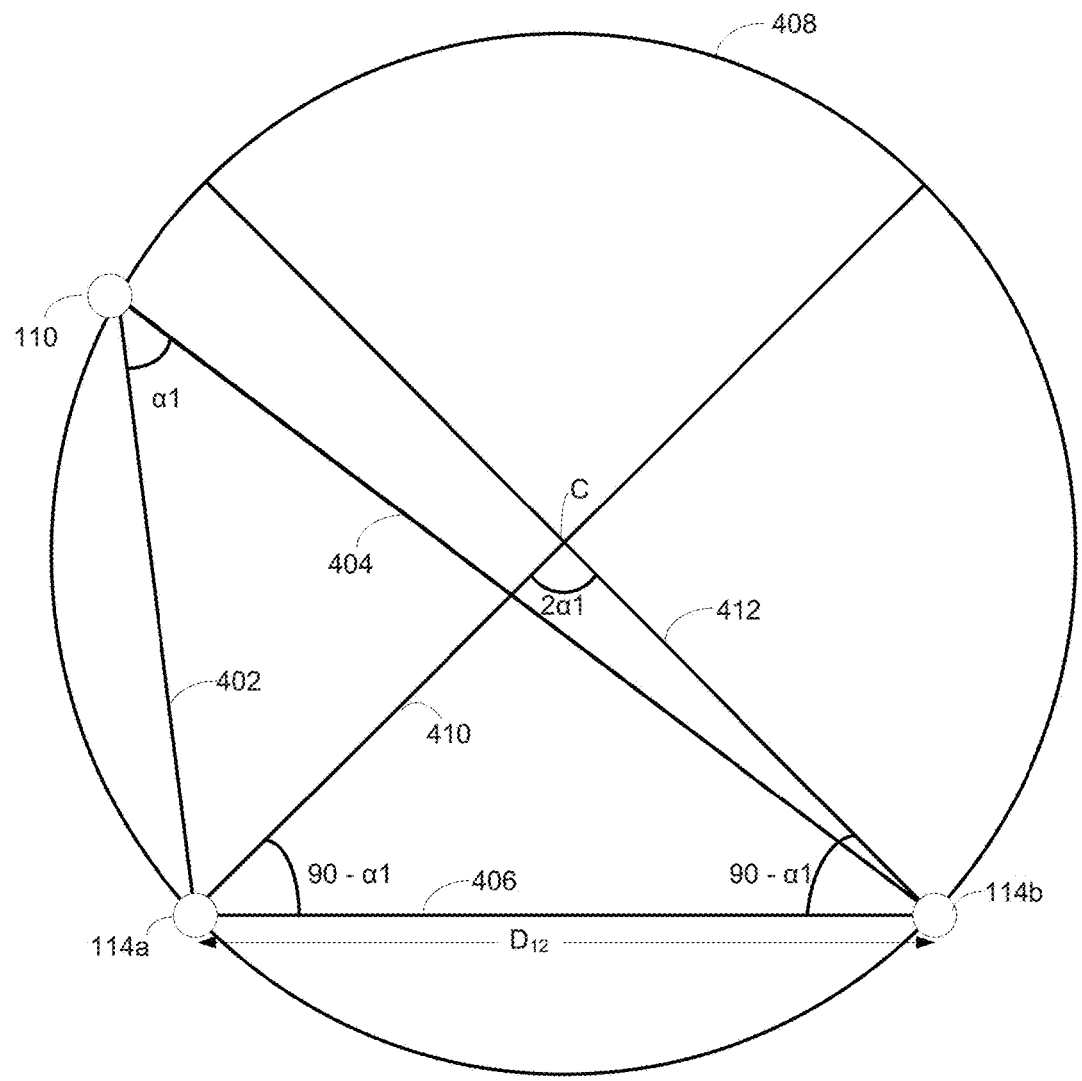
FIG. 4 is a diagram to illustrate principles of embodiments in which subtended angles are used to help determine the aforementioned angular direction.

In some embodiments, an angular direction from the UE 110 to the mmW AP 105 is determined based in part on subtended angles. FIG. 4 is a diagram to illustrate principles of embodiments in which subtended angles are used to help determine the aforementioned angular direction. FIG. 4 shows physical locations of two base stations 114a, 114b and a UE 110.

The distance between base stations 114a and 114b is $D_{12}$. The angle between the line 402 and line 404 measures α1 degrees. This angle is defined by the line 402 between the UE 110 and base station 114a and the line 404 between the UE 110 and base station 114b, with the UE 110 at the vertex. The line 406 between the base stations 114a, 114b is a chord of circle 408. The angle measuring α1 degrees at the UE 110 is the angle subtended by the chord 406. The circle 408 is defined by the chord 406 and the subtended angle α1. The radius (r) of the circle 408 is given by Equation 1.

$$r = \frac{D12}{2\sin(\alpha 1)} \quad \text{(Eq. 1)}$$

Also depicted in FIG. 4 are lines 410 and 412. Line 410 is defined by an angle measuring 90−α1 degrees with respect to chord 406 with base station 114a at the vertex. Line 412 is defined by the angle measuring 90−α1 degrees with respect to chord 406 with base station 114b at the vertex. At the intersection of line 410 and 412 is the center (C) of the circle 408. Chord 406 and a portion of lines 410 and 412 form a triangle with base station 114a as one vertex, base station 114b as a vertex and C as the third vertex. The angle of the triangle at the vertex labeled C measures 2α1 degrees.

Figure 5A:
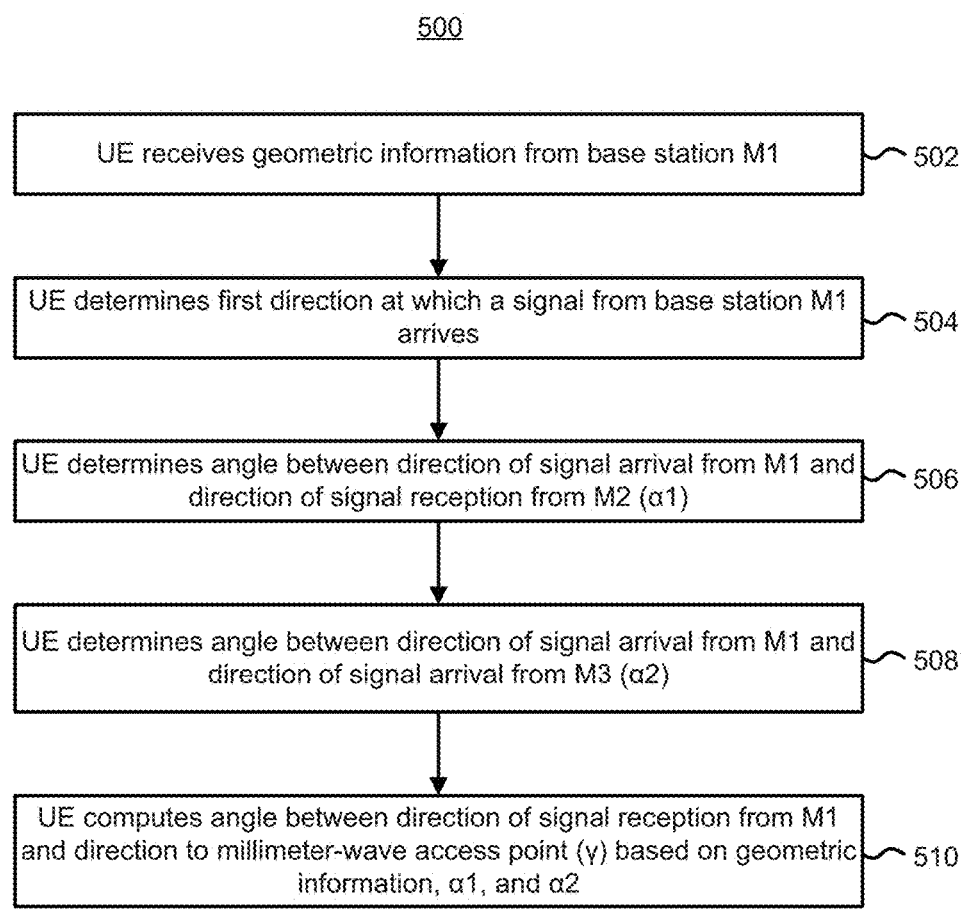
FIG. 5A is a flowchart of one embodiment of a process 500 of a UE computing an angular direction to a mmW AP, based on information received from a base station of a wireless network.
Figure 5B:
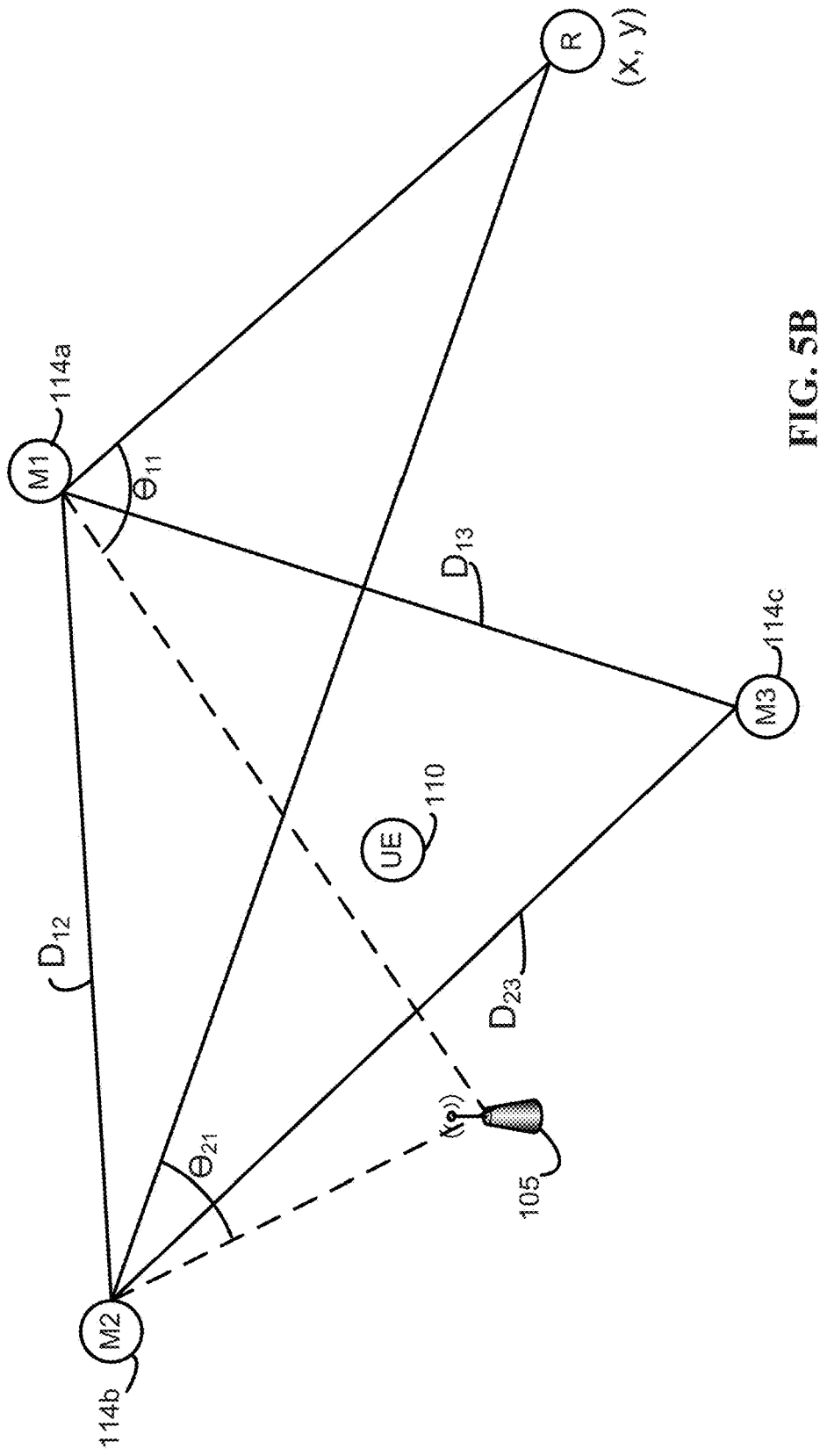
FIG. 5B is an example environment in which the process 500 of FIG. 5A may be practiced.

FIG. 5A is a flowchart of one embodiment of a process 500 of a UE 110 computing an angular direction to a mmW AP 105, based on information received from a base station 114 of a wireless network. FIG. 5B is an example environment 550 in which the process 500 may be practiced; however, process 500 is not limited to environment 550. For the sake of discussion, three base stations 114a-114c are depicted in FIG. 5B. These base stations will be referred to as M1, M2, and M3.

In step 502, the UE 110 receives information from a base station 114 in a wireless network. The information geometrically relates a first base station of a wireless network, a second base station of the wireless network, and a third base station of the wireless network, in one embodiment. For example, the information includes distances between pairs of base stations in the wireless network. In one embodiment, the information includes distances between at least three pairs of base stations 114. The information may further geometrically relate the base stations to some reference point. For example, the information may include distances between each base station in the wireless network and the reference point. In one embodiment, the information includes distances between at least three base stations 114 and the reference point. The information may also include a coordinate of the reference point. The reference point could be one of the base stations. Table I is one example of the information that can be received by the UE 110 in step 502.

TABLE I

|  | M1 | M2 | M3 | ... | Mn | Ref |
|---|---|---|---|---|---|---|
| M1 | 0 | $D_{12}$ | $D_{13}$ | ... | $D_{1n}$ | $D_{1R}$ |
| M2 | $D_{21}$ | 0 | $D_{23}$ | ... | $D_{2n}$ | $D_{2R}$ |
| M3 | $D_{31}$ | $D_{32}$ | 0 | ... | $D_{3n}$ | $D_{3R}$ |
| ... | ... | ... | ... | ... | ... | ... |
| Mn | $D_{n1}$ | $D_{n2}$ | $D_{n3}$ |  | 0 | $D_{nR}$ |

Table I contains the distance between pairs of base stations (M1, M2, ... Mn) in the wireless network. For example, $D_{12}$ refers to the distance between base station M1 and base station M2, $D_{13}$ refers to the distance between base station M1 and base station M3, $D_{1n}$ refers to the distance between base station M1 and base station Mn. Also, Table I contains the distance between each base station in the wireless network and a reference location (Ref). For example, $D_{1R}$ refers to the distance between base station M1 and the reference location. In one embodiment, Table I includes information for at least three base stations and the reference location. The reference location is an arbitrary location in the same plane as the base stations, in one embodiment. The reference location is specified in terms of an x-coordinate and a y-coordinate, in one embodiment.

Note that rather than providing the UE 110 with the distances between base stations 114, the physical coordinates (e.g., x, y coordinates) of each base station 114 could be provided to the UE 110. In this case, the UE 110 may calculate the distances between pairs of base stations 114 based on their physical coordinates.

The information of step 502 may also comprise a first angular direction to a mmW AP 105 from a first base station and a second angular direction from the second base station to the mmW AP 105, in one embodiment. Table II is one example of the angular direction information that can be received by the UE 110 in step 502.

TABLE II

|  | m1 | m2 | m3 | ... | mn |
|---|---|---|---|---|---|
| M1 | $\Theta_{11}$ | $\Theta_{12}$ | $\Theta_{13}$ | ... | $\Theta_{1n}$ |
| M2 | $\Theta_{21}$ | $\Theta_{22}$ | $\Theta_{13}$ | ... | $\Theta_{2n}$ |
| M3 | $\Theta_{31}$ | $\Theta_{32}$ | $\Theta_{33}$ | ... | $\Theta_{3n}$ |
| ... | ... | ... | ... | ... | ... |
| Mn | $\Theta_{n1}$ | $\Theta_{n2}$ | $\Theta_{n3}$ | ... | $\Theta_{nn}$ |

Table II contains angular directions from each base station (M1, M2, ... mn) to each mmW AP (m1, m2, ... mn) relative to the reference location. For example, $\Theta_{11}$ is the angle defined by a line between base station M1 and the reference location and a line between base station M1 and mmW AP m1. In one embodiment, Table II contains information for at least one mmW AP.

Referring to FIG. 5B, the UE 110 receives at least the following information in step 502, in one embodiment. The distances $D_{12}$, $D_{13}$, and $D_{23}$; the angles $\Theta_{11}$ and $\Theta_{21}$, and a coordinate for the reference location (R). FIG. 5B shows that the distance from base station M1 to M2 is $D_{12}$, the distance from base station M1 to M3 is $D_{13}$, the distance from base station M2 to M3 is $D_{23}$. FIG. 5B also shows a reference location (R) at an (x,y) coordinate. FIG. 5B also shows an angle $\Theta11$ between a line from base station M1 to R and a line from base station M1 to the mmW AP 105, as well as an angle $\Theta_{21}$ between a line from base station M2 to R and a line from base station M2 to the mmW AP 105. Note that with just this information, the UE 110 is not required to know, or to be able to determine, the (x,y) coordinates of the base stations or of the mmW AP 105.

Figure 5C:
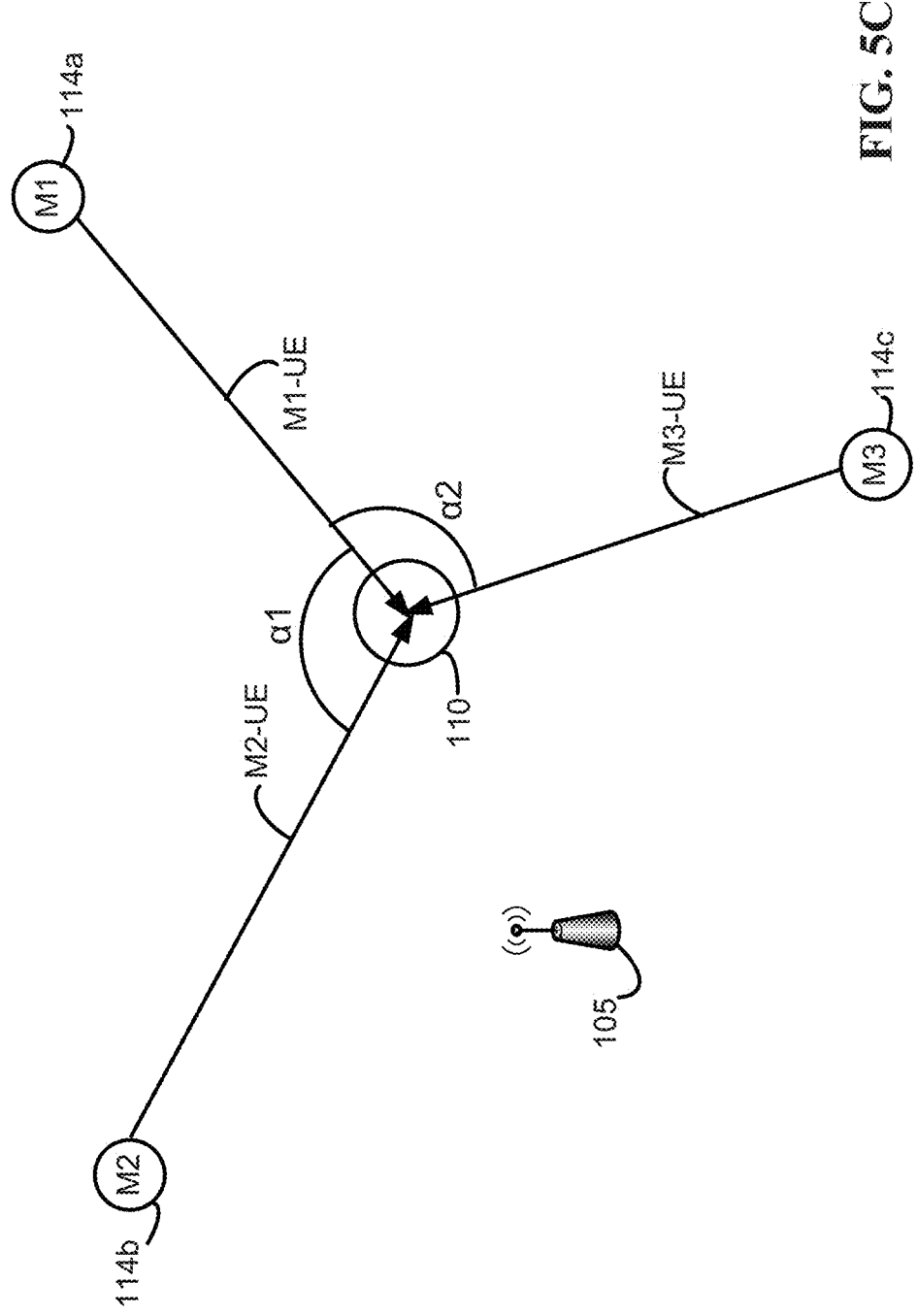
FIG. 5C is a diagram illustrating one embodiment of a UE determining directions of signal arrival from base stations.

In step 504, the UE 110 determines a first direction at which a first signal from base station M1 arrives at the UE 110. Referring to FIG. 5C, the UE 110 determines a direction of the line M1-UE. This may be with respect to a present orientation of the UE 110.

In step 506, the UE 110 determines a first angle between the first direction and a second direction at which a second signal from base station M2 arrives. Step 506 may include the UE 110 first determining the second direction at which the signal from base station M2 arrives at the UE 110. Referring to FIG. 5C, the UE 110 determines a direction of the line M2-UE, as well as the angle labeled α1.

In step 508, the UE 110 determines a second angle between the first direction and a third direction at which a second signal from base station M3 arrives. Step 508 may include the UE 110 first determining the third direction at which the signal from base station M3 arrives at the UE 110. Referring to FIG. 5C, the UE 110 determines a direction of the line M3-UE, as well as the angle labeled α2. Note that based just on the direction of arrival of the signals from the base stations 114, the UE 110 does not necessarily know the x,y coordinates of the base stations.

Figure 5D:
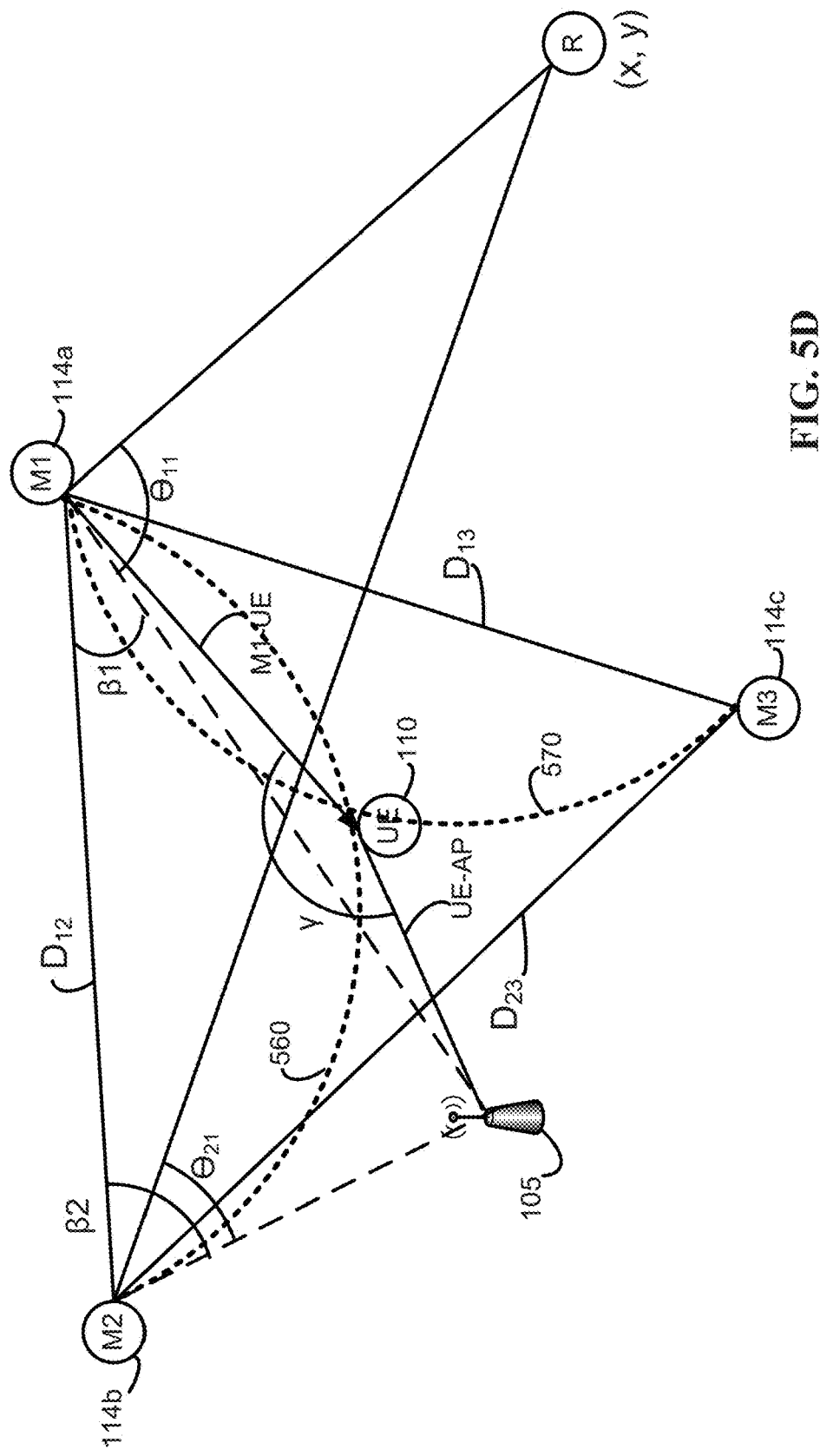
FIG. 5D is a diagram illustrating one embodiment of a determining angular direction to a mmW AP in process 500 of FIG. 5A.

In step 510, the UE 110 computes an angle between the first direction of the signal from base station M1 and a direction to the mmW AP 105 based on the information receive in step 502, and the angles which were determined in steps 506 and 508. Referring to FIG. 5D, the UE 110 determines the angle labeled γ. The angle γ is between line M1-UE and line UE-AP, with the UE 110 at the vertex.

Step 510 includes the following, in one embodiment. The UE 110 determines the angle between the line between base stations M1 and M2 and the line from M1 to the mmW AP 105. The UE 110 also determines the angle between the line between M1 and M2 and the line from M2 to the mmW AP 105. Referring to FIG. 5D, the UE 110 determines the angles labeled β1 and β2.

In one embodiment, the UE 110 determines the angle M2-M1-R (e.g., the angle between the line from M2 to M1 and the line from M1 to R, with M1 at the vertex. The angle β1 may be determined as the difference between the angle M2-M1-R and $\Theta_{11}$. Recall that the UE 110 may be provided $\Theta_{11}$ in step 502.

Similarly, the UE 110 determines the angle M1-M2-R (e.g., the angle between the line from M1 to M2 and the line from M2 to R, with M2 at the vertex. The angle β2 may be determined by adding the angle M1-M2-R and $\Theta_{21}$. Recall that the UE 110 may be provided $\Theta_{21}$ in step 502

In one embodiment, step 510 yields two possible candidate locations of the UE 110, with one candidate for angle γ for each candidate location. The candidate locations for the UE 110 may be determined based on subtended angles. Based on subtended angles, the UE 110 is able to determine two circles. The two circles may intersect in two locations, each of which is a candidate location of the UE 110.

Referring back to FIG. 4, note that the UE 110 has determined the subtended angle $\alpha 1$, and has been given the length of the chord (e.g., the distance from base station 114*a* to 114*b*). Recall that Equation 1 can be used to determine the radius of the circle based on the length of the chord and the sine of the subtended angle. Thus, the UE 110 can determine a circle based on subtended angle $\alpha 1$. A second circle may be determined based on subtended angle $\alpha 2$. FIG. 5D shows a first arc 560 to represent a portion of the first circle, and a second arc 570 to represent a portion of the second circle. FIG. 5D shows two candidate locations for the UE 110, one at each intersection of the two arcs. That is, the two candidate locations are where arc 560 and 570 intersect.

Given the candidate locations for the UE 110 (e.g., as depicted in FIG. 5D), the UE 110 may calculate angle $\gamma$ based on the angles $\beta 1$ and $\beta 2$. The angles $\beta 1$ and $\beta 2$, as well as the locations of M1 and M2 may be used to determine a candidate location of the mmW AP 105. Note that the UE 110 is also able to determine a triangle formed by M1, M2, and M3. The reference location (R), as well as distances from the base stations to R may be used to determine the orientation of the triangle, in one embodiment. This, in effect, fixes the locations of the base stations in an x-y coordinate system. The angle $\gamma$ may be determined based on the candidate location of the UE 110, the candidate location of M1, and the angles $\beta 1$ and $\beta 2$.

Variations of process 500 are possible. In another embodiment, the UE 110 is provided with the angles $\beta 1$ and $\beta 2$, in step 502. In this case, the UE 110 need not be provided with the angles $\Theta_{11}$, $\Theta_{21}$ in step 502. Thus, the UE 110 need not compute $\beta 1$ and $\beta 2$, in one embodiment of step 510. The UE 110 may still calculate the angle $\gamma$ based on the provided angles $\beta 1$ and $\beta 2$.

Note that it is possible for there to be some reflections of the signals that arrive at the UE 110 from the base stations 114. In some embodiments, the signals are transmitted at below 6 GHz. In effect, one embodiment of the process 500 assumes that the signals from the base stations 114 are line of sight. In other words, the calculation of a candidate angle $\gamma$ may be based on an assumption that the signals arrive at the UE 110 on a line of sight. In some embodiments, a number of candidate angles $\gamma$ may be determined, with the knowledge that some angles $\gamma$ may be invalid, or somewhat inaccurate. A refined angle $\gamma$ can be determined by an analysis of the candidate angles. This may, in effect, screen out signals received at the UE 110 that were not in fact line of sight signals.

Figure 5E:
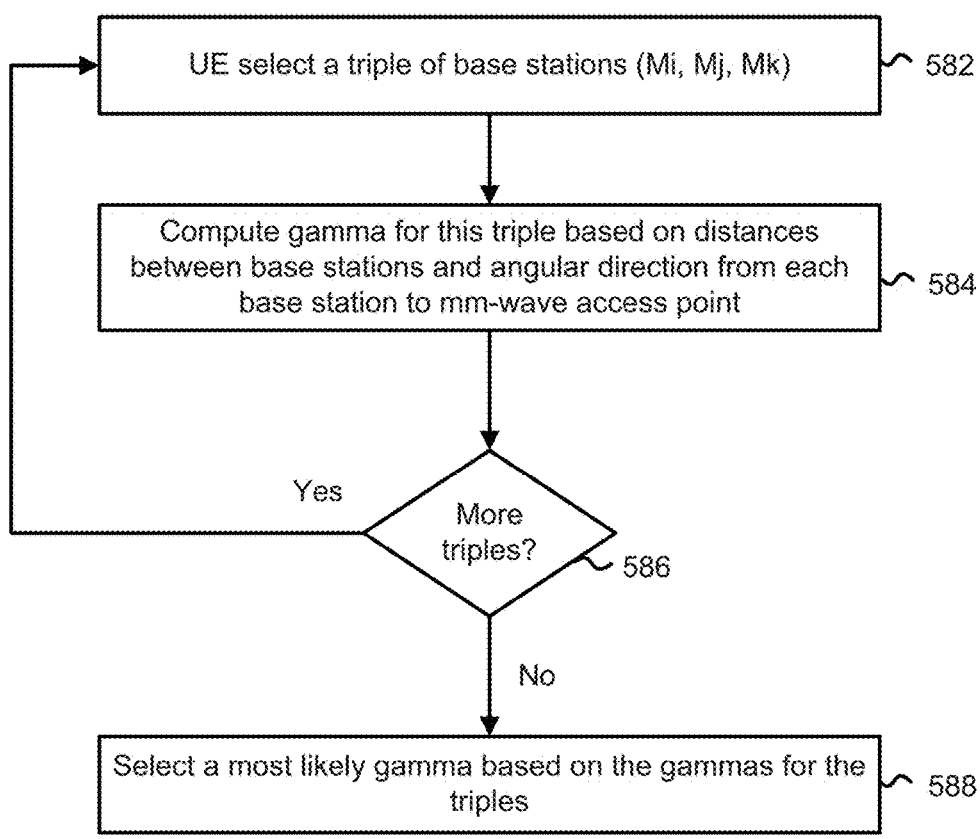
FIG. 5E is a flowchart of one embodiment of a process 580 of generating candidate values for the angle γ, and determining a most likely angle γ based on the candidates.

FIG. 5E is a flowchart of one embodiment of a process 580 of generating candidate values for the angle $\gamma$, and determining a most likely angle $\gamma$ based on the candidates. The process 580 may repeat the process 500 for various triples of base stations 114. Process 580 may begin after step 502 of process 500, in which the UE 110 receives the geometric information from the wireless network. In step 582, the UE 110 selects a triple of base stations (Mi, Mj, Mk) from the geometric information. A triple may include zero, one, or two base stations in common with another triple.

In step 584, the UE 110 computes a candidate angle $\gamma$ for this triple of base stations. In one embodiment, the UE 110 performs steps 504-510 from process 500 for this triple. Note that step 584 could result in one or two candidate angles $\gamma$.

Step 586 is a determination of whether a candidate angle $\gamma$ should be determined for more base station triples. If not, then the candidate angles $\gamma$ are analyzed in step 588 to select a most likely angle $\gamma$. This may be referred to as a refined value for the angle $\gamma$. Numerous techniques may be used to make the selection. The selection need not be one of the candidate angles $\gamma$. For example the selection could be based on a mean value.

In one embodiment, step 588 includes clustering the candidate values for the angle $\gamma$. Outliers can be removed. The cluster with the greatest number of candidate values for the angle $\gamma$ may be determined to be most likely to represent the correct value for the angle $\gamma$. In one embodiment, the mean value of this cluster of candidate values is used as the refined value for the angle $\gamma$.

An alternative to the process of FIGS. 5A-5E is to use two pairs of base stations, instead of a triple of base stations. FIG. 5F depicts a variation of FIGS. 5A-5E in which there is an additional base station M4. In this variation, the UE also determines the direction of arrival of the signal from base station M4. Also, the angle $\alpha 2$ is with respect to base stations M3 and M4 instead of with respect to base stations M1 and M3, as in FIG. 5C. In effect, the example of FIG. 5C may be considered to be a special case in which M4 and M1 are the same base station. Thus, a variation of the process 580 in FIG. 5E is to select two pairs of base stations (e.g., M1 and M2 as one pair and M3 and M4 as another pair).

Figure 6A:
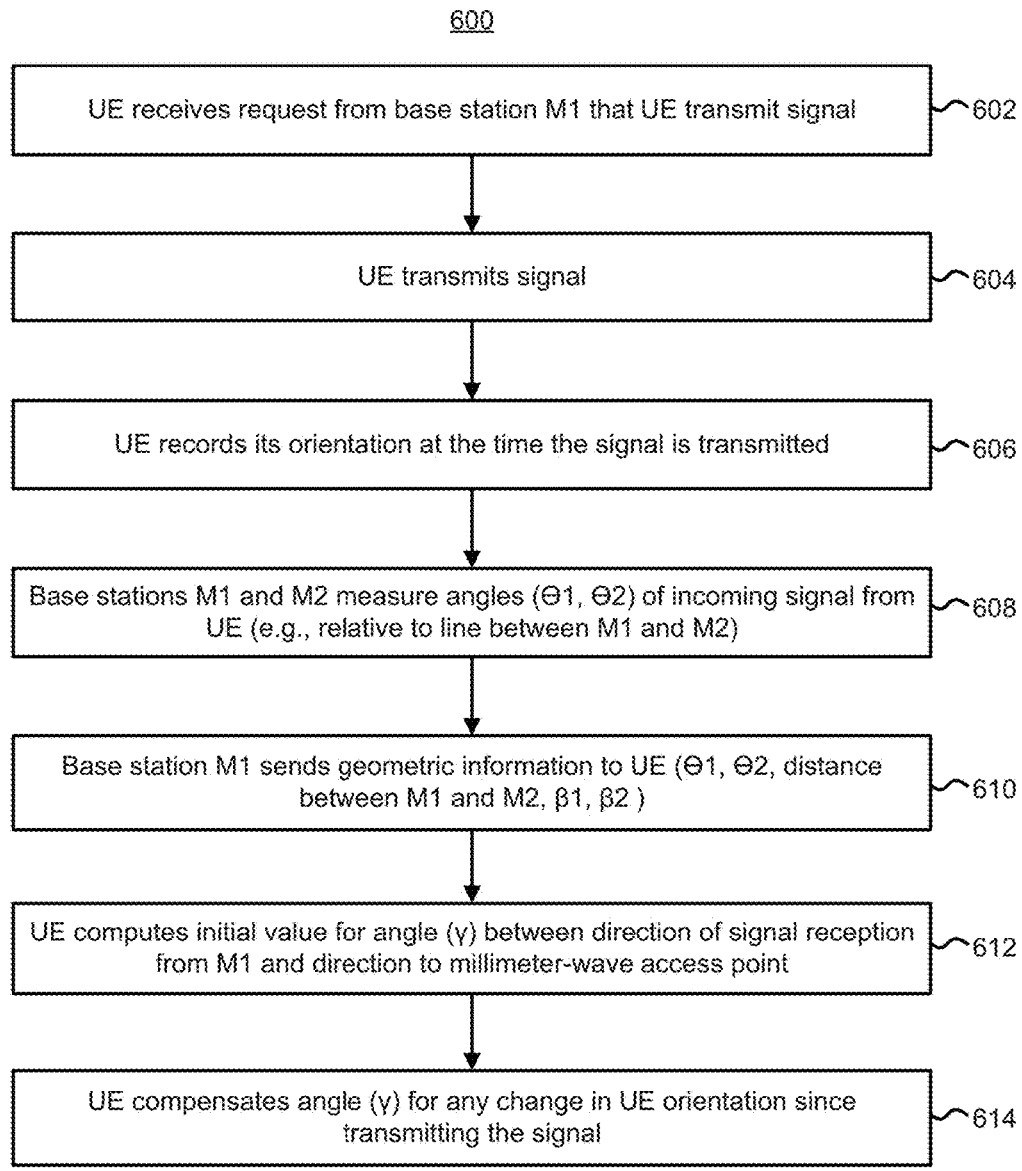
FIG. 6A is a flowchart of one embodiment of a process 600 of base stations in a wireless network assisting a UE to acquire access to a mmW AP.
Figure 6B:
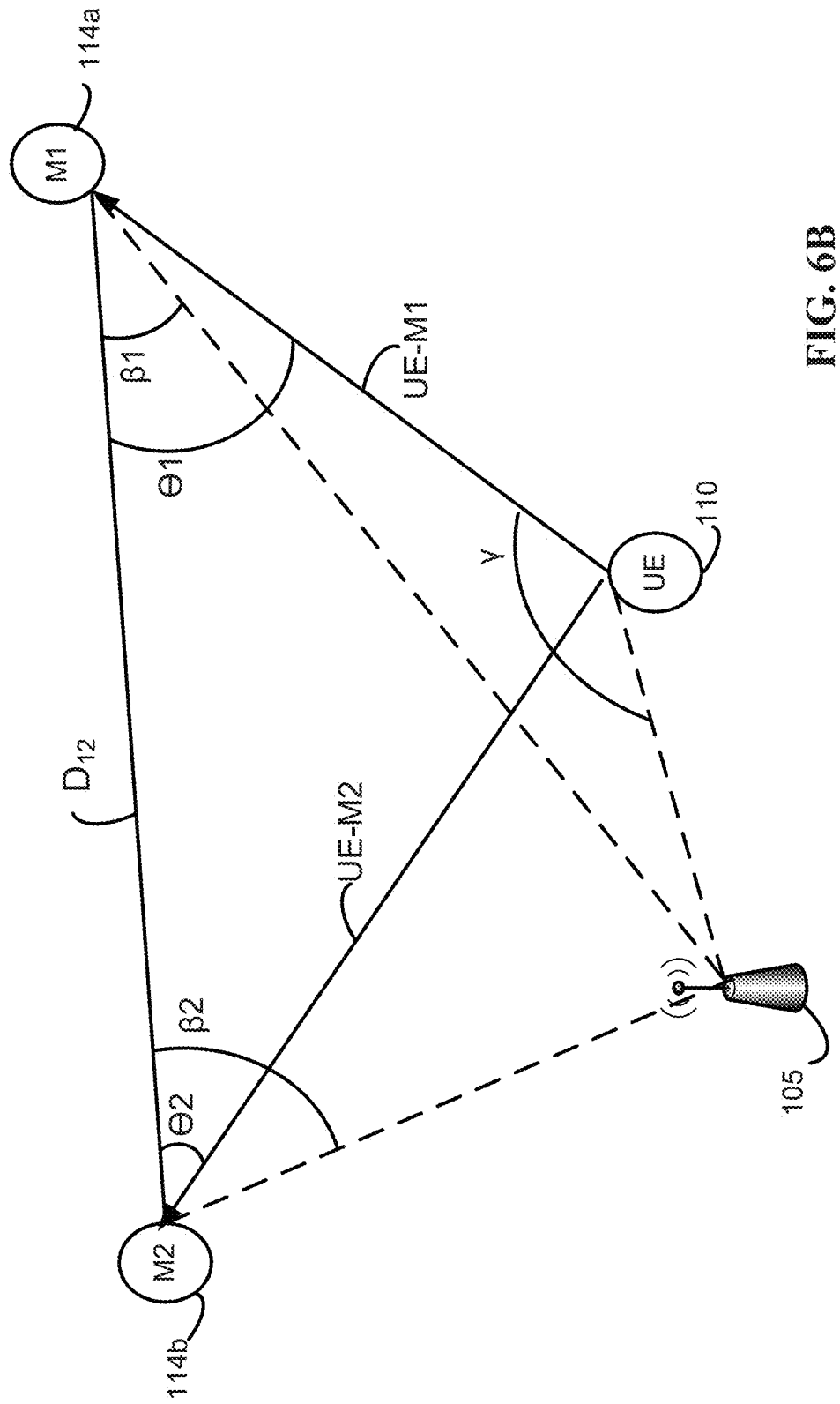
FIG. 6B shows an example communication environment in which process 600 of FIG. 6A may be practiced.

In one embodiment, the UE 110 transmits a signal to base stations 114, as a part of the process that assists the UE 110 in acquiring access to a mmW AP 105. FIG. 6A is a flowchart of one embodiment of a process 600 of base stations 114 in a wireless network assisting a UE 110 to acquire access to a mmW AP 105. Process 600 will be discussed in reference to FIG. 6B, which shows an example communication environment. FIG. 6B shows base stations 114*a*, 114*b* (which are labeled as M1 and M2, respectively), UE 110, and mmW AP 105.

In step 602, the UE 110 receives a request from a base station (e.g., base station M1 in FIG. 6B) to transmit an uplink signal. In one embodiment, this is an uplink signal in the wireless network. This signal may be an omni-directional signal.

In step 604, the UE 110 transmits the signal, in response to the request from the base station. In one embodiment, this is a random access transmission. This signal could be a signal used in an LTE RACH procedure. This signal could be an SRS sounding reference signal.

In step 606, the UE 110 records its orientation at the time that the UE 110 transmitted the signal. In one embodiment, the UE 110 records horizontal and vertical angles with respect to a reference. The UE 110 may use a gyroscope circuit to determine the orientation. In one embodiment, the UE 110 records Euler angles.

In step 608, base stations M1 and M2 determine an angle of the incoming signal from the UE 110. In one embodiment, each base station (e.g., M1, M2) determines a direction of arrival of the signal from the UE 110 and computes the angle relative to a line between the two base stations. FIG. 6B depicts angles $\Theta 1$ and $\Theta 2$, which may be computed in step 608. The line UE-M1 represents the direction of the arrival of the signal from the UE 110 at base station 114*a*. Angle $\Theta 1$ is the angle defined by line UE-M1 and the line labeled $D_{12}$ between the base stations, with base station M1 at the vertex. The line UE-M2 represents the direction of the arrival of the signal from the UE 110 at base station 114*b*. Angle $\Theta 2$ is the angle defined by line UE-M2 and the line labeled $D_{12}$ between the base stations, with base station M2 at the vertex.

In step 610, the wireless network (e.g., base station 114*a*) sends geometric information to the UE 110. In one embodiment, the geometric information includes angles $\Theta 1$, $\Theta 2$, β1, and β2, as shown in FIG. 6B. The angle β1 is the angle defined by M2-M1-UE. In other words, it is the angle defined by a first line between base station 114b and base station 114a, and a second line between base station 114a and the UE 110, with base station 114a at the vertex. The angle β2 is the angle defined by M1-M2-UE. In other words, it is the angle defined by a first line between base station 114a and base station 114b, and a second line between base station 114b and the UE 110, with base station 114b at the vertex. The geometric information may also include the distance between the two base stations. This is represented in FIG. 6B as $D_{12}$.

Figure 6C:
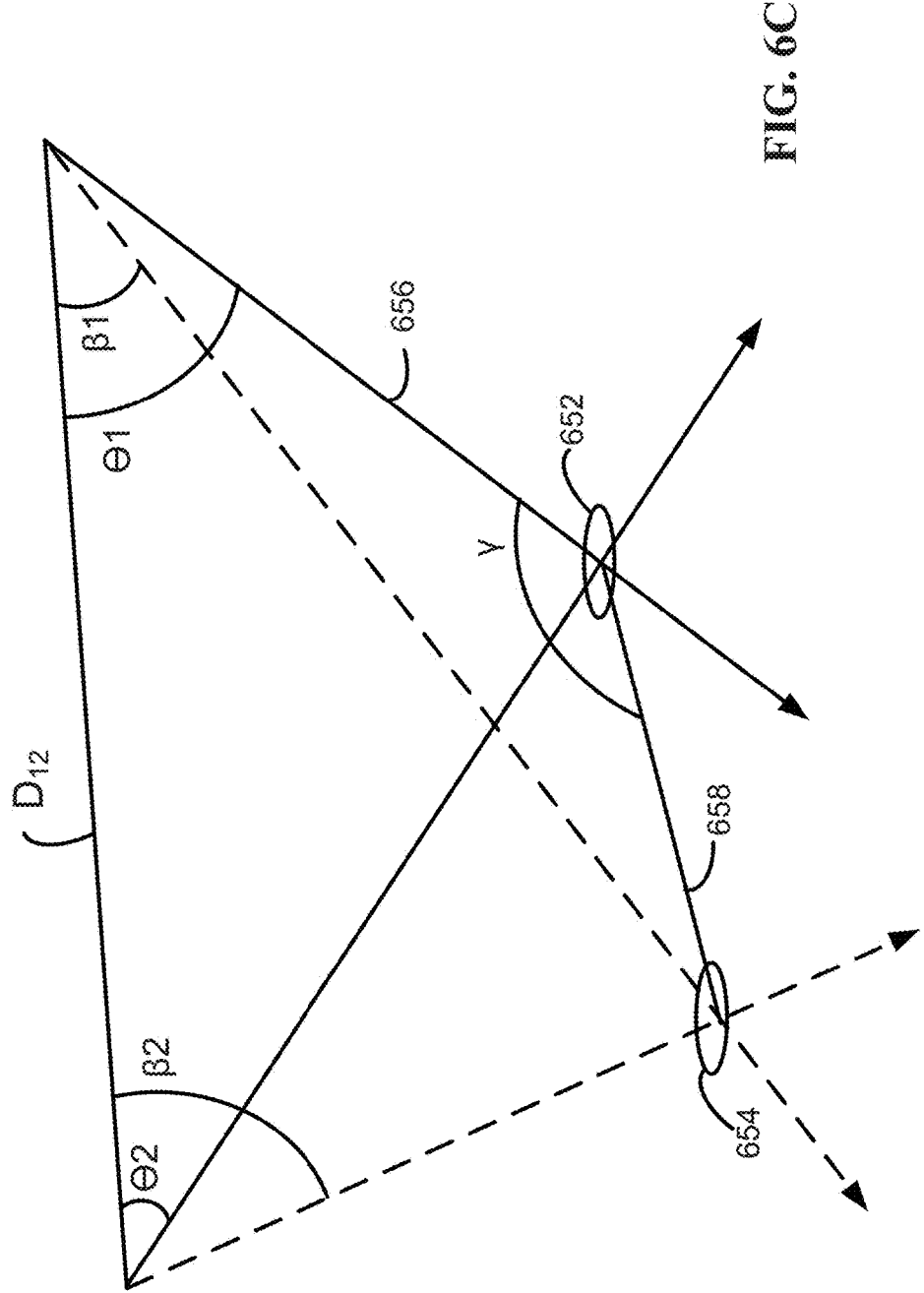
FIG. 6C is a diagram to illustrate one embodiment for the computation of an angular direction to a mmW AP.

In step 612, the UE 110 computes an initial value for the angle to the mmW AP 105 (e.g., angle γ) based on the geometric information. FIG. 6C is a diagram to illustrate one embodiment for the computation. A candidate location 652 for the UE 110 may be determined based on the length of line $D_{12}$ and angles ⊖1 and ⊖2. A candidate location 654 for the mmW AP 105 may be determined based on the length of line D12 and angles β1 and β2. An initial value for angle γ may be determined based on lines 656 and 658, with the candidate location 652 of the UE 110 at the vertex.

In step 614, the UE 110 compensates the angle to the mmW AP 105 (e.g., angle γ) for any change in the orientation of the UE 110 since the UE 110 transmitted the signal in step 604. This is based on the orientation that was recorded in step 606.

Variations of process 600 are possible. For example, rather than the UE 110 computing the angle γ in step 612, the wireless network (e.g., base station 114 or computer system 150) computes the angle γ based on the direction at which the signal from the UE 110 arrived that the base station, and geometric information. The wireless network may transmit the angle γ to the UE 110, which may compensate based on any change in orientation since step 604 (as described in step 614). In one embodiment, the UE 110 transmits Euler angles to the wireless network based on the orientation recorded in step 606. The angle γ may be with respect to the Euler angles.

As previously discussed, it possible for there to be some reflections of the signals that arrive at the UE 110 from the base stations 114. Likewise, it possible for there to be some reflections of the signals that arrive at the base stations 114 from the UE 110. In effect, one embodiment of the process 600 assumes that the signals from the UE 110 to the base stations 114 are line of sight. In other words, the calculation of a candidate angle γ may be based on an assumption that the signals arrive on a line of sight. In some embodiments, a number of candidate angles γ may be determined, with the knowledge that some may be invalid, or inaccurate. A refined angle γ can be determined by an analysis of the candidate angles. This may, in effect, screen out invalid candidate angles, as well as improve the accuracy of candidate angles.

Figure 6D:
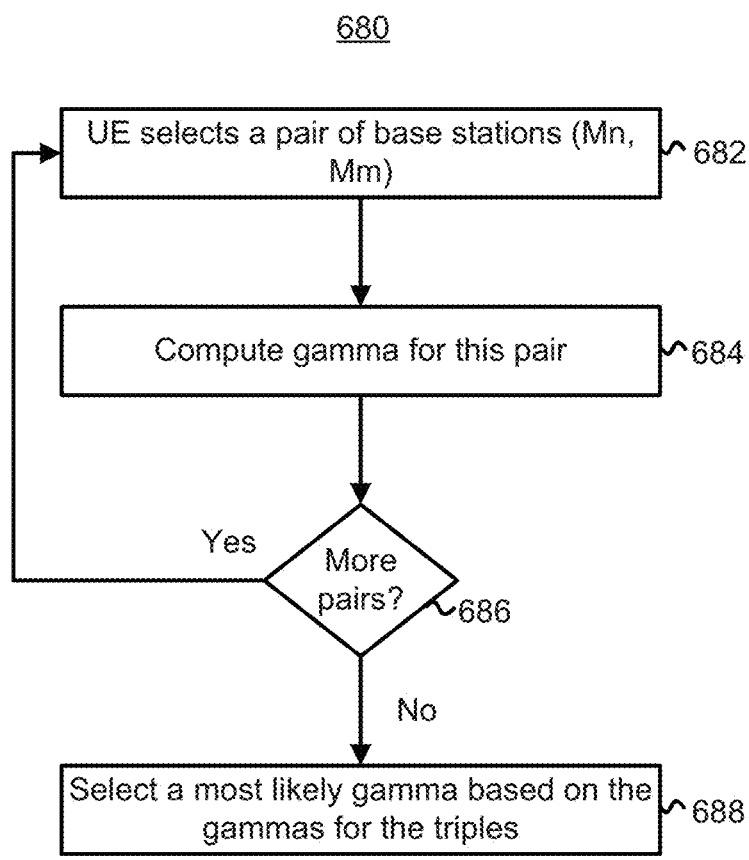
FIG. 6D is a flowchart of one embodiment of a process 680 of generating candidate values for the angle γ from a UE to a mmW AP, and determining a most likely angle γ based on the candidates.

FIG. 6D is a flowchart of one embodiment of a process 680 of generating candidate values for the angle γ, and determining a most likely angle γ based on the candidates. The process 680 may repeat the process 600 for various pairs of base stations 114. Process 680 may begin after step 610 of process 600, in which the UE 110 receives geometric information from the wireless network. However, in step 608, there are additional base stations 114 in the wireless network that measure the angle of the signal from the UE 110. Likewise, in step 610, the geometric information contains information for additional base stations 114. The geometric information may include the distance between each pair of base stations in a set of base stations. The geometric information may further include an angle ⊖ for each base station. Referring to FIG. 6B, recall that the angle ⊖ refers to the angle from a base station to the UE 110 with reference to a line to the other base station in the pair. The geometric information may further include an angle β for each base station. Referring to FIG. 6B, recall that the angle β refers to an angle from the base station to the mmW AP 105, with reference to the line to the other member of the pair of base stations.

In step 682, the UE 110 selects a pair of base stations (Mn, Mm) from the geometric information. A pair may include zero or one base stations in common with another pair.

In step 684, the UE 110 computes a candidate angle γ for this pair of base stations. In one embodiment, the UE 110 performs steps 612-614 from process 600 for this pair.

Step 686 is a determination of whether a candidate angle γ should be determined for more base station triples. If not, then the candidate angles γ are analyzed in step 688 to select a most likely angle γ. This may be referred to as a refined value for the angle γ. Numerous techniques may be used to make the selection. The selection need not be one of the candidate angles γ. For example the selection could be based on a mean value.

In one embodiment, step 686 includes clustering the candidate values for the angle γ. Outliers can be removed. The cluster with the greatest number of candidate values for the angle γ may be determined to be most likely to represent the correct value for the angle γ. In one embodiment, the mean value of this cluster of candidate values is used as the refined value for the angle γ.

One embodiment includes a fingerprinting technique to assist a UE 110 in gaining access to a mmW AP 105. The wireless network maintains a database that maps reference signal strengths to directional access information for the UE 110, in one embodiment. In one embodiment, the directional access information is an angular direction to a mmW AP 105. In one embodiment, the directional access information comprises beamforming parameters.

FIG. 7A depicts an example table 700 of one embodiment of a database that maps reference signal strengths to an angular direction to mmW APs 105. The table 700 may be stored in non-transitory memory storage. Table 700 has "n" rows of entries. Each of the rows could pertain to a physical location. For example, all of the entries in a given row could pertain to a location of a UE 110. Some of the columns contain data for a reference signal strength for a signal received at a particular base station 114 (e.g., M1, M2, M3, M4, M5). The reference signal could be a signal transmitted by a UE 110. For example, for the entry for row 1, the reference signal strength at base station M1 is −87.5 dbm, the reference signal strength at base station M2 is −66 dbm, the reference signal strength at base station M3 is 72 dbm, the reference signal strength at base station M4 is −56 dbm, and the reference signal strength at base station M5 is −69 dbm. Note that each row of data may be based on data from many UEs 110. For example, the data for a row may be averages of signal strengths from different UEs at about the same physical location.

Some of the columns contain an angle at which a mmW AP 105 can be expected to be found given the reference signal strengths in that row. For example, if a UE 110 were to transmit an uplink signal that resulted in the reference signal strengths in row 1, then the UE 110 could expect to see mmW AP m1 at 47 degrees with respect to a reference point. Similarly, the UE 110 could expect to see mmW AP m2 at 220 degrees with respect to the reference point, mmW AP m3 at 93 degrees with respect to the reference point, and mmW AP m4 at 22 degrees with respect to the reference point.

FIG. 7B depicts an example table 710 of one embodiment of a database that maps reference signal strengths to beamforming parameters to access mmW APs 105. The table 710 may be stored in non-transitory memory storage. Table 710 is similar to Table 700, with a difference being that the angles are replaced with beamforming parameters (e.g., P11, P12, etc.). Beamforming parameters P11 refer to parameters that a UE 110 could use to access mmW AP m1, beamforming parameters P12 refer to parameters that a UE 110 could use to access mmW AP m2, etc. For example, these may be weights (e.g., numerical values) assigned to individual antenna transmission. A beam may be formed by using an antenna array having multiple antennas. Assigning different weights to the transmissions from different antennas allows forming different beams.

Figure 7C:
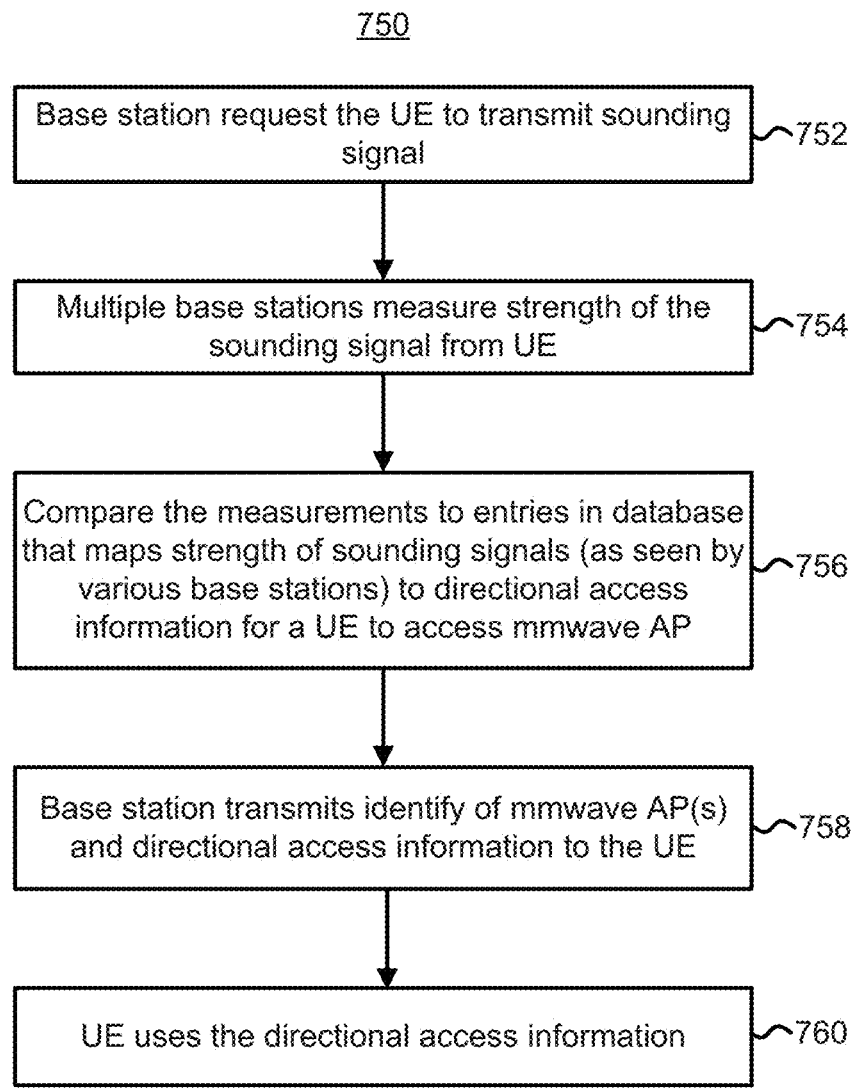
FIG. 7C is a flowchart of one embodiment of a process 750 of assisting a UE to gain access to a mmW AP using a database that maps reference signal strengths to directional access information.

FIG. 7C is a flowchart of one embodiment of a process 750 of assisting a UE 110 to gain access to a mmW AP 105 using a database that maps reference signal strengths to directional access information for the UE 110 to gain access to the mmW AP 105. In step 752, a base station 114 requests that the UE 110 transmit a sounding signal.

In step 754, multiple base stations 114 in the wireless network measure the strength of the sounding signal from the UE 110.

In step 756, the various measurements are compared to table entries in order to determine directional access information for the UE 110 to access a selected mmW AP in the table. For example, it might be determined that entry 3 in Table 700 in FIG. 7A is closest to the various signal strengths at M1, M2, M3, M4, and M5. In this case, the expected angle from the UE 110 to mmW AP m1 (with respect to some reference) is 289 degrees. Expected angles to other mmW APs 105 may also be determined from the Table 700.

It is not required that the information from just one row in the Table 700 be used to determine the angle. For example, in some cases, the measured signal strengths at the base stations may be close to two different rows. In this case, the angles from both rows can be used to determine an angle from the UE 110 to a particular mmW AP 105. For example, averaging of values for the angles might be used.

As another example, Table 710 from FIG. 7B might be used in a manner similar to Table 700. In this case, beamforming parameters are determined from the selected row (or rows) of Table 710.

In step 758, the base station transmits the identity of the mmW AP 105 and the directional access information to the UE 110.

In step 760, the UE 110 uses the directional access information to attempt to access a mmW AP 105. For example, the UE 110 transmits a beam-formed signal in the direction of the angle to the mmW AP 105 and/or listens for a beam-formed signal transmitted from the mmW AP 105, based on an angle in the directional access information. As another example, the UE 110 sets antenna weights based on beamforming parameters in order to send and/or receive a beam-formed signal to/from the mmW AP 105.

Figure 8A:
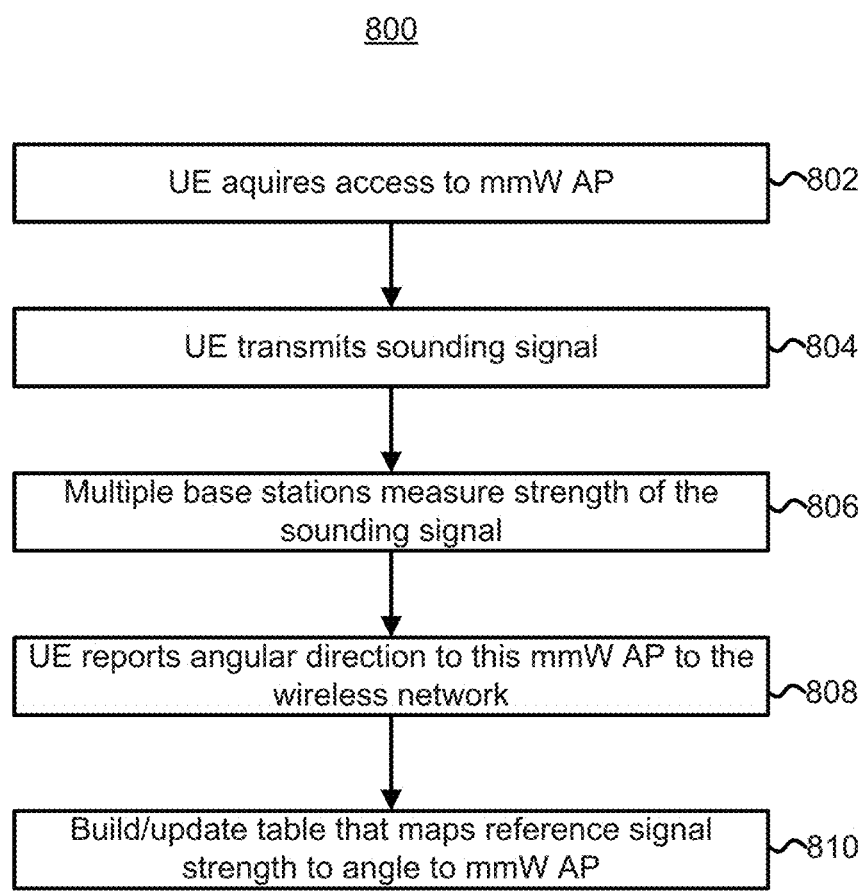
FIG. 8A is a flowchart of one embodiment of a process 800 of building a database that maps reference signal strengths to angles to access a mmW AP.

FIG. 8A is a flowchart of one embodiment of a process 800 of building a database that maps reference signal strengths to angles to access a mmW AP 105. The process 800 may be used to build the database of FIG. 7A. Process 800 describes collecting data for one UE 110. The process 800 may be repeated for other UEs 110 to collect additional data.

In step 802, a UE 110 gains access to a mmW AP 105. In step 804, the UE transmits a sounding signal. The UE 110 may transmit this sounding signal in response to a request from the wireless network.

In step 806, multiple base stations 114 measure the strength of the sounding signal from the UE 110.

In step 808, the UE 110 reports an angular direction to the mmW AP 105, as well as an identification of the mmW AP 105 to the wireless network. In one embodiment, the UE 110 reports the angular direction with respect to a direction of arrival of a signal from a base station 114 that is presently serving the UE 110. Note that the UE 110 may report information for more than one mmW AP 105.

In step 810, the information from the UE 110 is used to build/update the table that maps reference signal strengths to angles to access a mmW AP 105. Initially, this information may be a new entry in the table. As more data is collected, rather than adding a new entry, this new data may be merged with data from an existing entry in the table. For example, when two UEs 110 are at about the same physical location, it may be expected that their reference signal strengths and angles to mmWAPs 105 may be similar. Hence, such similar data could be averaged and merged into a single table entry.

Figure 8B:
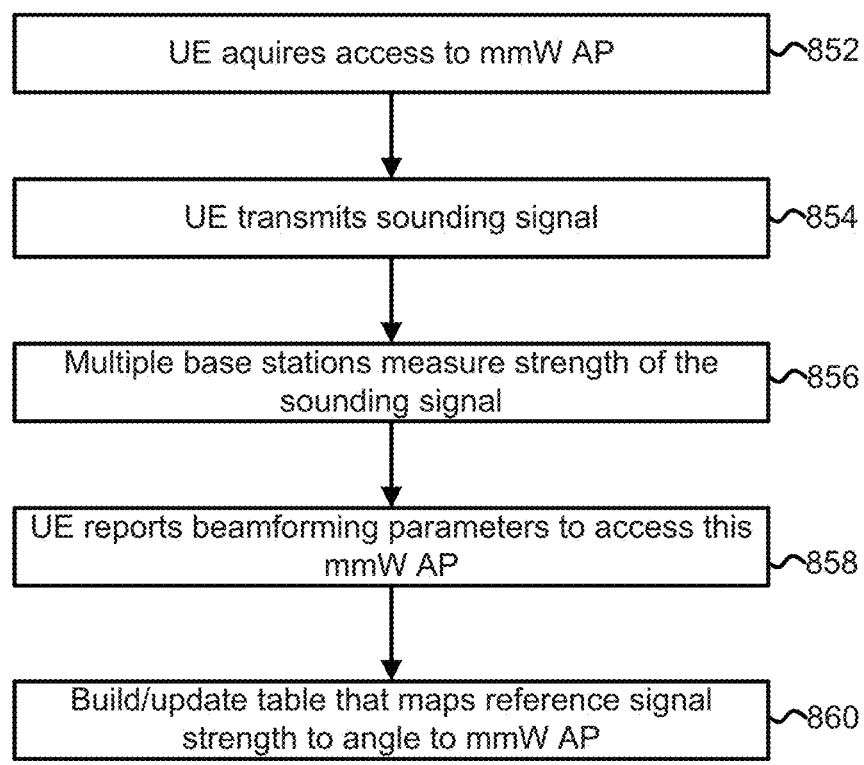
FIG. 8B is a flowchart of one embodiment of a process 850 of building a database that maps reference signal strengths to beamforming parameters to access a mmW AP.

FIG. 8B is a flowchart of one embodiment of a process 850 of building a database that maps reference signal strengths to beamforming parameters to access a mmW AP 105. The process 850 may be used to build the database of FIG. 7B. Process 850 describes collecting data for one UE 110. The process 850 may be repeated for other UEs 110 to collect additional data. Process 850 is similar to process 800, and hence similar aspects will not be described in detail. A difference between the processes is that instead of reporting angles to the mmW AP 105, the UE 110 reports the beamforming parameters that it used when accessing a particular mmW AP 105. For example, the UE 110 reports antenna weights.

Figure 9A:
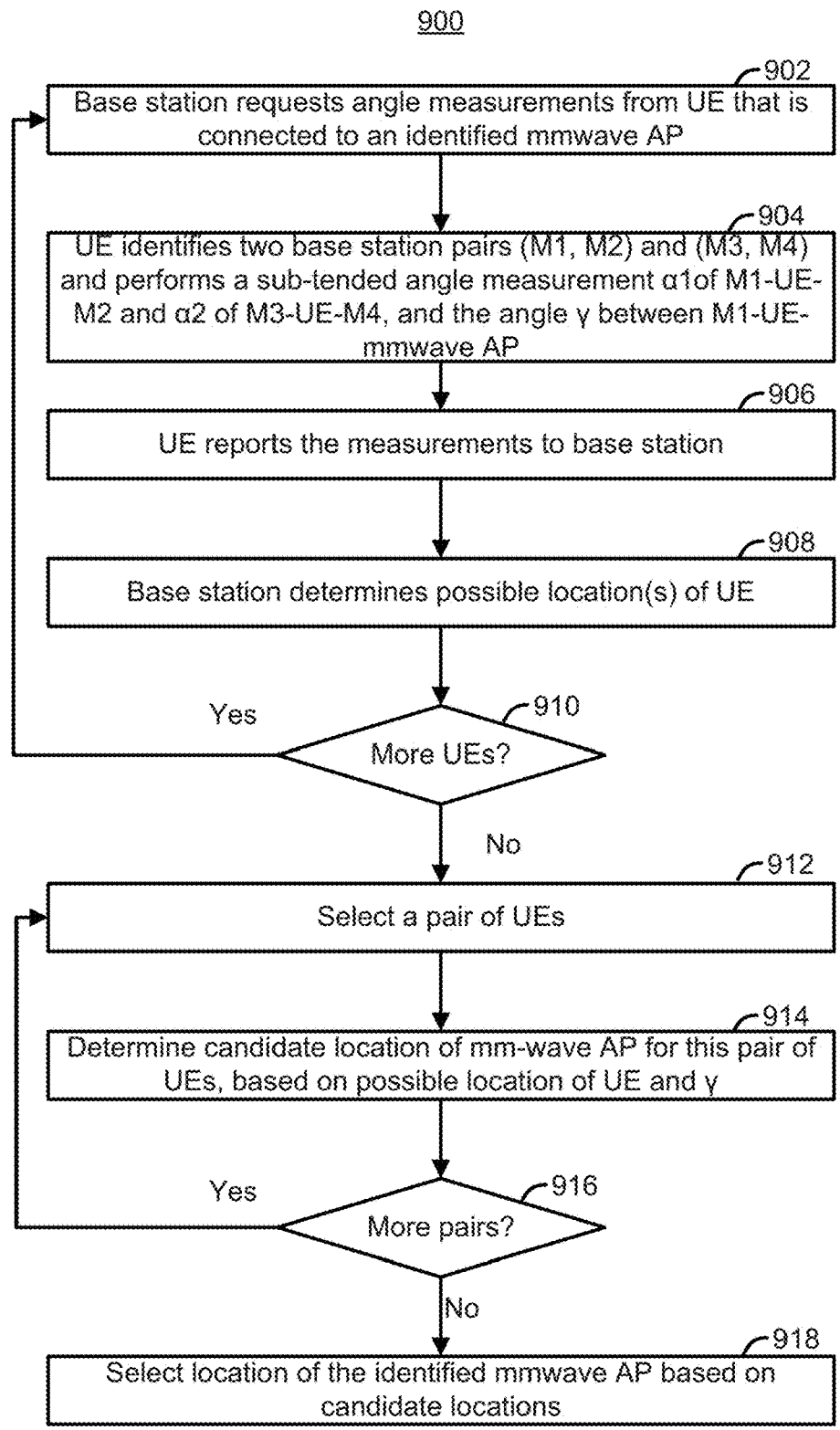
FIG. 9A is a flowchart of one embodiment of a process 900 of building a database of locations of mmWAPs.

FIG. 9A is a flowchart of one embodiment of a process 900 of building a database of locations of mmW APs 105. Note that locations of mmWAPs 105 may be difficult to determine due to factors such as locations of mmW APs 105 being inaccessible to GPS. Process 900 uses a subtended angle approach.

In step 902, a base station 114 requests angle measurements from a UE 110 that is connected to an identified mmW AP 105.

In step 904, the UE 110 identifies two base station pairs, for example, (M1, M2) and (M3, M4). The UE 110 performs a first subtended angle measurement (α10) of M1-UE-M2 a second subtended angle measurement (α2) of M3-UE-M4. Note that the two pairs may have one base station in common. For example, referring back to FIG. 5C, the UE 110 measures the subtended angle α1 of M1-UE-M2 and the subtended angle α2 of M1-UE-M3.

In step 904, the UE 110 also measures the angle to the mmW AP 105 with respect to a reference. For example, referring back to FIG. 5D, the UE 110 measures the angle γ of M1-UE-mmW AP.

In step 906, the UE 110 reports the measurements to the serving base station 114 in the wireless network.

Figure 9B:
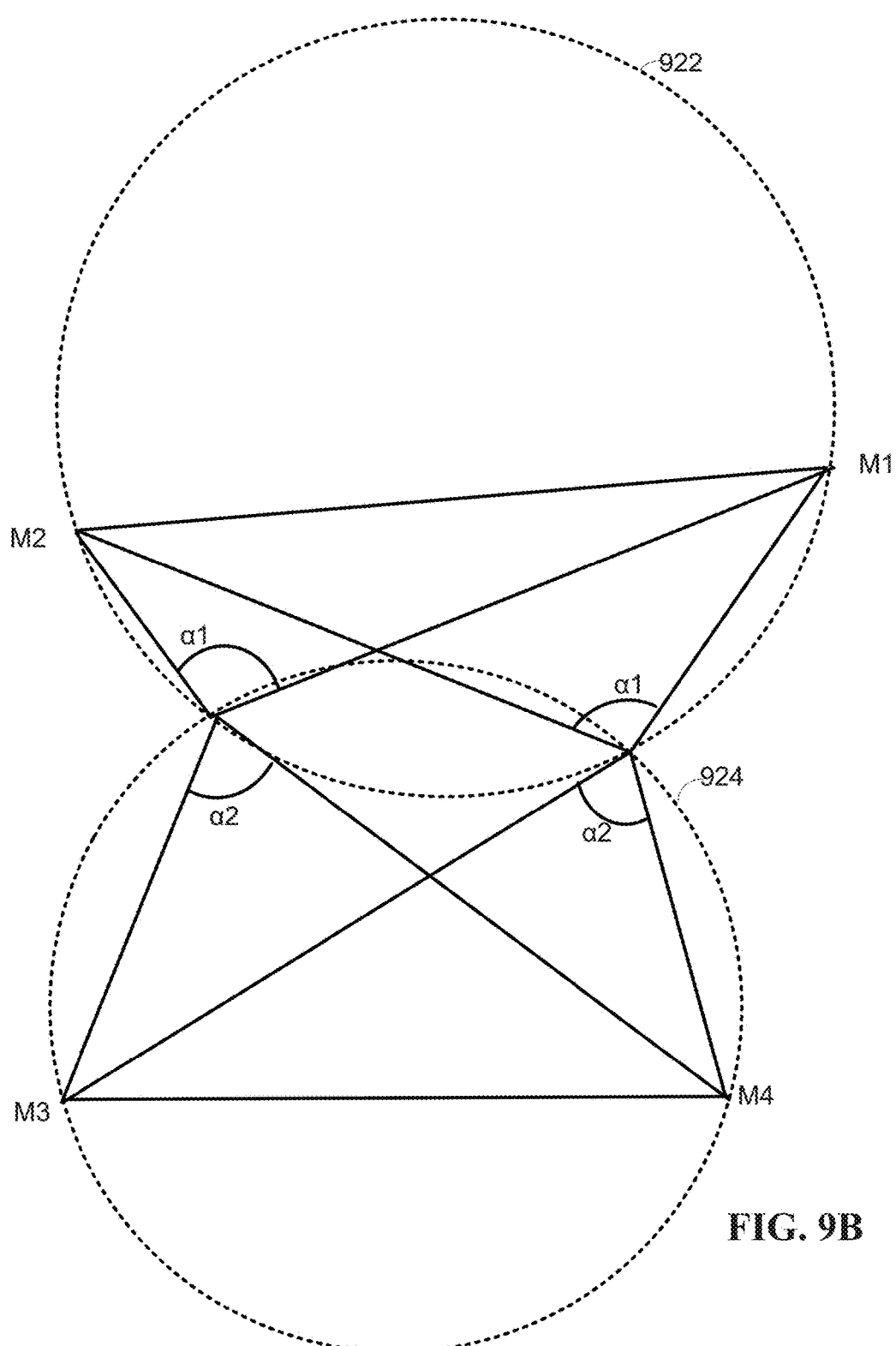
FIG. 9B depicts details of one embodiment of determining candidate locations of the UE using subtended angles.

In step 908, the wireless network determines one or more possible locations of the UE 110. In one embodiment, the wireless network uses a procedure based on subtended angles. FIG. 9B depicts details of one embodiment of determining candidate locations of the UE 110 using subtended angles. FIG. 9B shows the physical locations of four base stations (M1, M2, M3, M4). Based on subtended angle α1 and the distance between M1 and M2, circle 922 may be determined. The wireless network may use Equation 1. The line between M1 and M2 is a chord of the circle 922 to be used in Equation 1. Based on subtended angle α2 and the distance between M3 and M3, circle 924 may be determined. The line between M3 and M4 is a chord of the circle 924 that may be used in Equation 1. The intersection of the two circles 922, 924 represent two candidate locations of the UE 110. The wireless network records these candidate locations (for example, by storing in non-transitory memory storage), as well as the angle γ of M1-UE-mmW AP, which was provided by the UE 110. The wireless network also associates the angle γ with the two candidate locations.

Step 910 is a determination of whether there are more UEs to process. If so, steps 902-908 are performed for other UEs 110 in order to generate other UE 110 candidate locations, each of which is associated with an angle γ that defined an angle from the UE 110 to a mmW AP 105, with respect to some reference (such as a base station 114). The wireless network may record these other candidate locations in non-transitory memory storage.

Figure 9C:
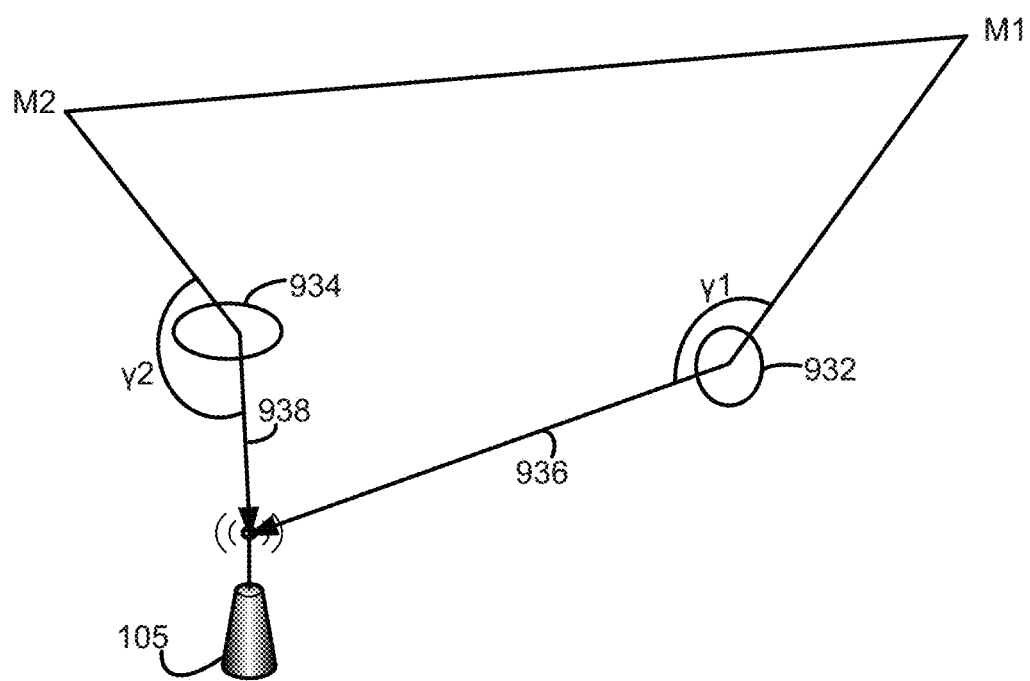
FIG. 9C shows two candidate locations for UEs during one embodiment of the process 900 of FIG. 9A.

In step 912, a pair of candidate UE 110 locations are selected. In step 914, a candidate location of a mmW AP 105 is determined for this pair of candidate UE locations. FIG. 9C depicts an example of one embodiment of determining a candidate location for a mmW AP 105. FIG. 9C shows two candidate locations 932, 934 for UEs. The angle γ1 is used to determine line 936 from UE candidate location 932. Note that the angle γ1 was provided by the UE 110 when that candidate location was determined. The angle γ2 is used to determine line 938 from UE candidate location 934. Note that the angle γ2 was provided by the UE 110 when that candidate location was determined. The intersection of lines 936 and 938 is a candidate location of a mmW AP 105.

Step 916 is a determination of whether more pairs of candidate UE locations should be processed. If so, steps 912-914 are repeated with other candidate UE locations to generate other candidate locations for a mmW AP 105.

Step 918 is to select a location for the mmW AP 105 based on the candidate locations of the mmW AP 105. A clustering technique may be used to select the final location of the mmW AP 105. This location may then be added to a database of mmW AP locations. In some cases, the location of a mmW AP 105 may change. Thus, the location determined by process 900 may be used to update the location for a mmW AP 105 that is already in the database. In some cases, this may just be a refinement of the location even though the mmW AP 105 did not in fact move. In other words as the process 900 is repeated to gain additional data, the locations of the mmW APs 105 may be more precisely determined.

Figure 10A:
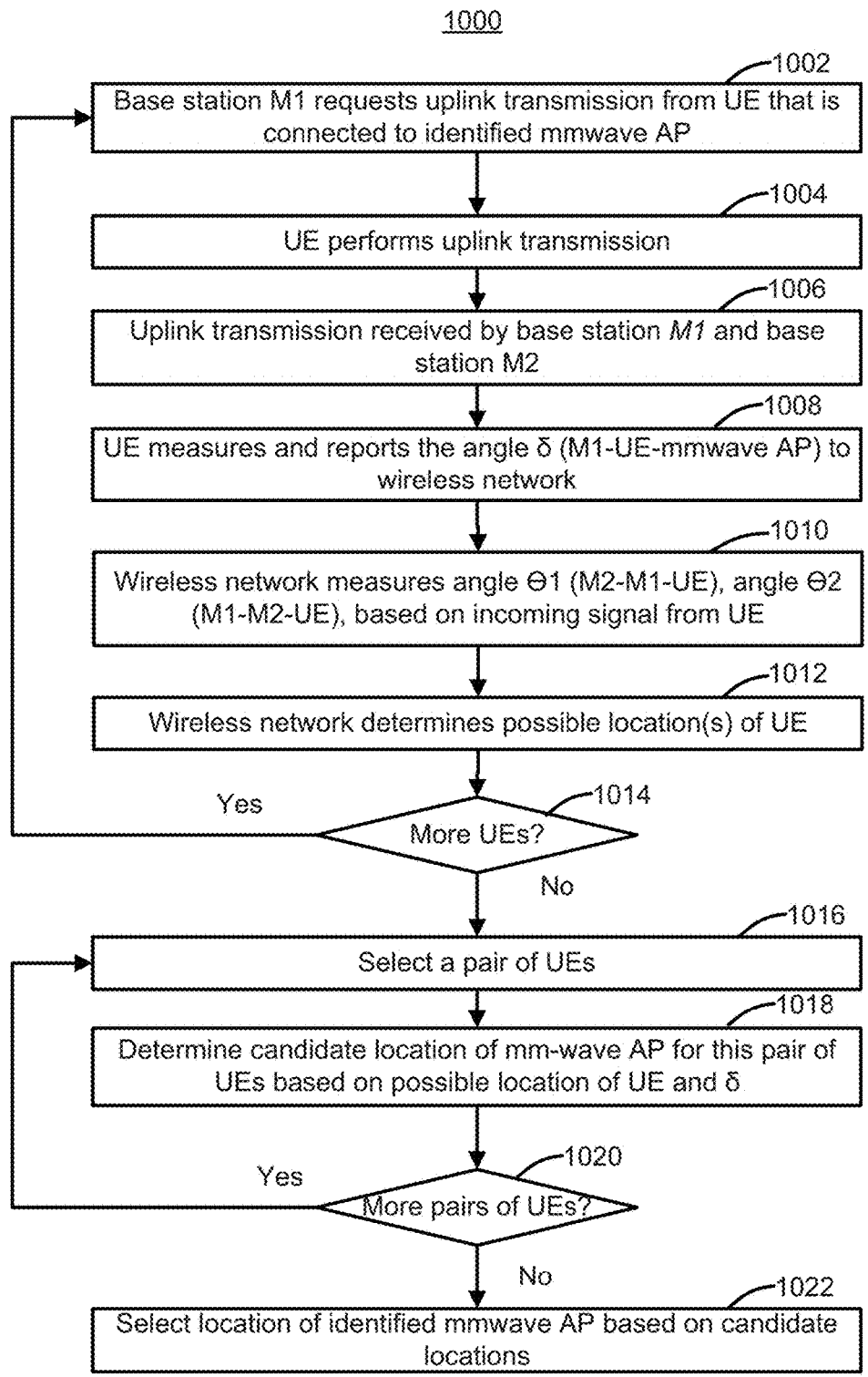
FIG. 10A is a flowchart of one embodiment of a process 1000 of building a database of locations of mmW APs.

FIG. 10A is a flowchart of one embodiment of a process 1000 of building a database of locations of mmW APs 105. Process 1000 uses an uplink signal approach. Certain actions in process 1000 are described as being performed by wireless network. These might be performed at one of the base stations 114, or some computing system 150 in the core network 102.

In step 1002, a base station requests an uplink transmission from a UE 110 that is connected to an identified mmW AP 105.

In step 1004, the UE 110 performs the uplink transmission.

In step 1006, the uplink transmission is received by a first base station 114 (M1) and a second base station 114 (M2).

In step 1008, the UE 110 measures and reports an angular direction to a mmW AP 105 to the wireless network (e.g., reports to base station M1).

Figure 10B:
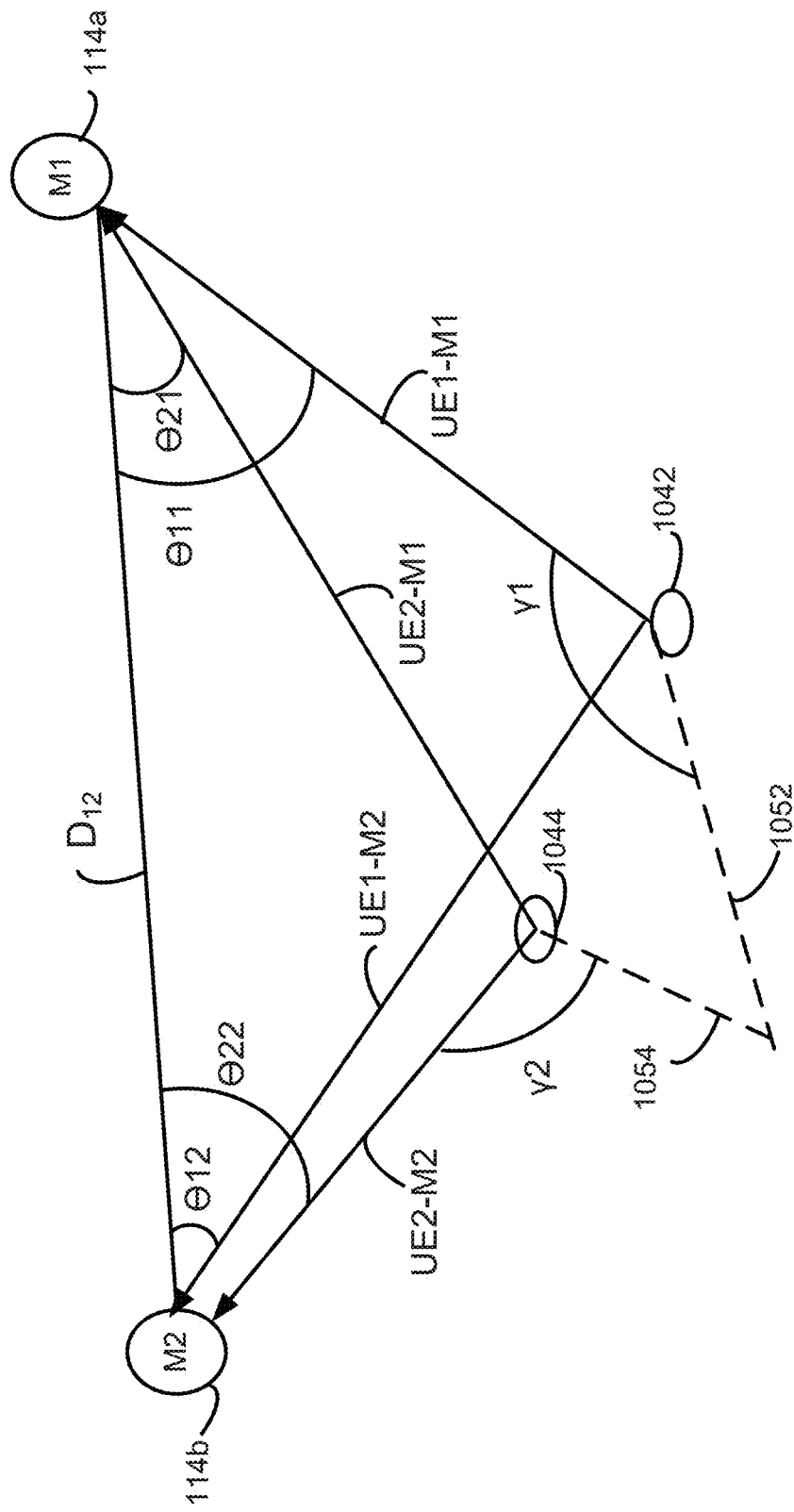
FIG. 10B is a diagram to illustrate measuring an angle of an arrival direction of a signal from a UE.

In step 1010, the wireless network measures the angle Θ between the arrival direction of the signal from the UE 110 at one base station (e.g., M1) and a line between that base station and another. Referring to FIG. 10B, line UE1-M1 represents a direction of arrival of a signal from UE1. Angle Θ11 represents the angle between line UE1-M1 and the line between base stations M1 and M2. Referring to FIG. 10B, line UE1-M2 represents a direction of arrival of a signal from UE1. Angle Θ12 represents the angle between line UE1-M2 and the line between base stations M1 and M2.

Step 1012 is the wireless network determining a possible location of the UE 110. The angles Θ11 and e12, along with the locations of base stations M1 and M2 may be used to determine a location of UE 1. Referring to FIG. 10B, a possible location 1042 is depicted at the intersection of lines UE1-M1 and UE1-M2.

Step 1014 is a determination of whether data from more UEs 110 should be processed. If so, steps 1002-1012 are repeated for another UE 110.

In step 1016, a pair of UEs 110 are selected. In step 1018, a candidate location of a mmW AP 105 is determined based on the data for this pair of UEs 110. Referring to FIG. 10B, candidate locations 1042, 1044 for a pair is UEs 110 are depicted. Candidate location 1044 is for UE2, based on a signal from UE2 that is received at base station M1 and M2. Lines UE2-M2 and UE2-M1 for UE2 may be determined in a similar manner as lines UE1-M2 and UE1-M1 for UE1.

The angle γ1 (which was reported by UE1) may be used to determine dashed line 1052, based on line UE1-M1. The angle γ2 (which was reported by UE2) may be used to determine dashed line 1054, based on line UE2-M2. The intersection of dashed lines 1052 and 1054 is a candidate location of a mmW AP 105.

Step 1020 is a determination of whether data from more pairs of UEs should be processed. If so, steps 1016-1018 are repeated with a different pair of UEs 110 to generate another candidate location of a mmW AP 105.

In step 1022 a location of the mmW AP 105 is determined based on the candidate locations. In one embodiment, clustering of the candidate locations is performed to determine the location. Outliers can be removed. The cluster with the greatest number of candidate locations may be determined to be most likely to represent the correct location. In one embodiment, the mean value of this cluster of candidate locations is used as the refined value for the location of the mmW AP 105.

While embodiments herein have been discussed with respect to a wireless network providing assistance to the UE 110 to access the mmW AP 105, other possibilities exist. In one embodiment, the UE 110 receives assistance from peer devices. In one embodiment, the UE 110 receives assistance from a combination of peer devices a node in a wireless network. For example, the UE 110 may receive assistance from one or more peer devices and one or more eNodeBs in a wireless network. In one embodiment, the communication between the UE 110 and the peer devices can use mmWave directional communication, but this is not required.

In one embodiment, a UE, which is already connected to one or multiple mmW APs 105 will transmit beamformed (directional) beacons, wherein the beacon from the transmitter UE includes the relative angle of the serving mmWAPs 105 with respect to the beacon transmission direction. A receiver UE may estimate the receive angle of the mmWave beacon and use it as a reference to estimate the angle of the mmW AP 105. Then it may use this angle to beamform toward the mmW AP 105. The precision of the mmW AP direction will increase with the number of different UE directional beacons received.

For a vehicular communication (connected car) case, the vehicles (transmitter UEs) may send directional beacons in well-defined directions such as front, behind and laterals. Such beacons may carry information about the mmW AP 105 direction with respect to each beacon, and in addition could specify the beacon direction with respect to the movement direction (ahead, back, lateral left, lateral right). The receiver UE (in this case another vehicle in proximity), may use this information to estimate the serving mmW AP 105 direction.

Figure 11:
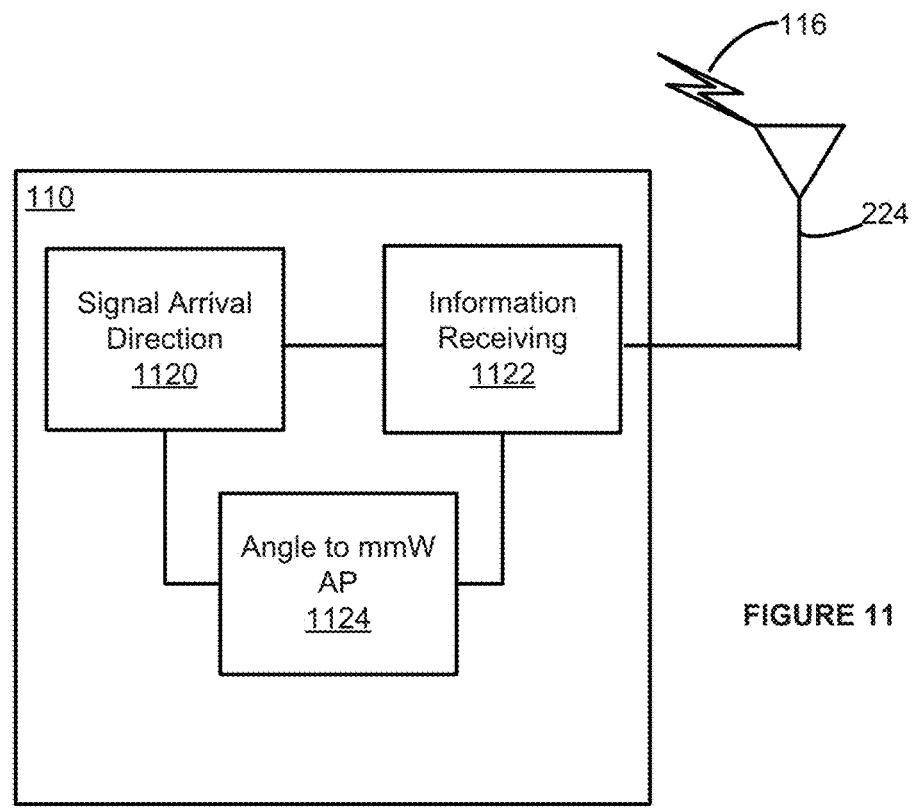
FIG. 11 depicts one embodiment of a mobile wireless communication device.

FIG. 11 depicts one embodiment of a mobile wireless communication device 110. The mobile wireless communication device 110 includes an information receiving element 1122 (which may be implemented by transceiver 222) that receives information that geometrically relates a first base station of a wireless network, a second base station of the wireless network, and a third base station of the wireless network, and comprises a first angular direction to a millimeter wave access point (mmW AP) from the first base station and a second angular direction from the second base station to the mmW AP. The mobile wireless communication device includes signal arrival direction element (which may be implemented by processing unit 220) that determines a first direction of arrival of a first signal from the first base station and determines a first angle between the first direction of arrival and a second direction of arrival of a second signal from the second base station and determine a second angle between the first direction of arrival and a third direction of arrival of a third signal from the third base station. The mobile wireless communication device 110 includes angular direction to mmW AP element 1124 (which may be implemented by processing unit 220) that determines an angular direction from the mobile wireless communication device to the mmW AP, based on the information, the first angle, and the second angle.

In one embodiment, the information receiving element 1122 receives information from the wireless network that geometrically relates a first base station in the wireless network with a second base station in the wireless network, and comprises a first angular direction from the first base station to a millimeter wave access point (mmW AP) and a second angular direction from the second base station to the mmW AP. In one embodiment, the angular direction to mmW AP element 1124 computes an angular direction from the mobile wireless communication device to the mmW AP based on the information and the orientation of the mobile wireless communication device when the signal was transmitted.

Figure 12:
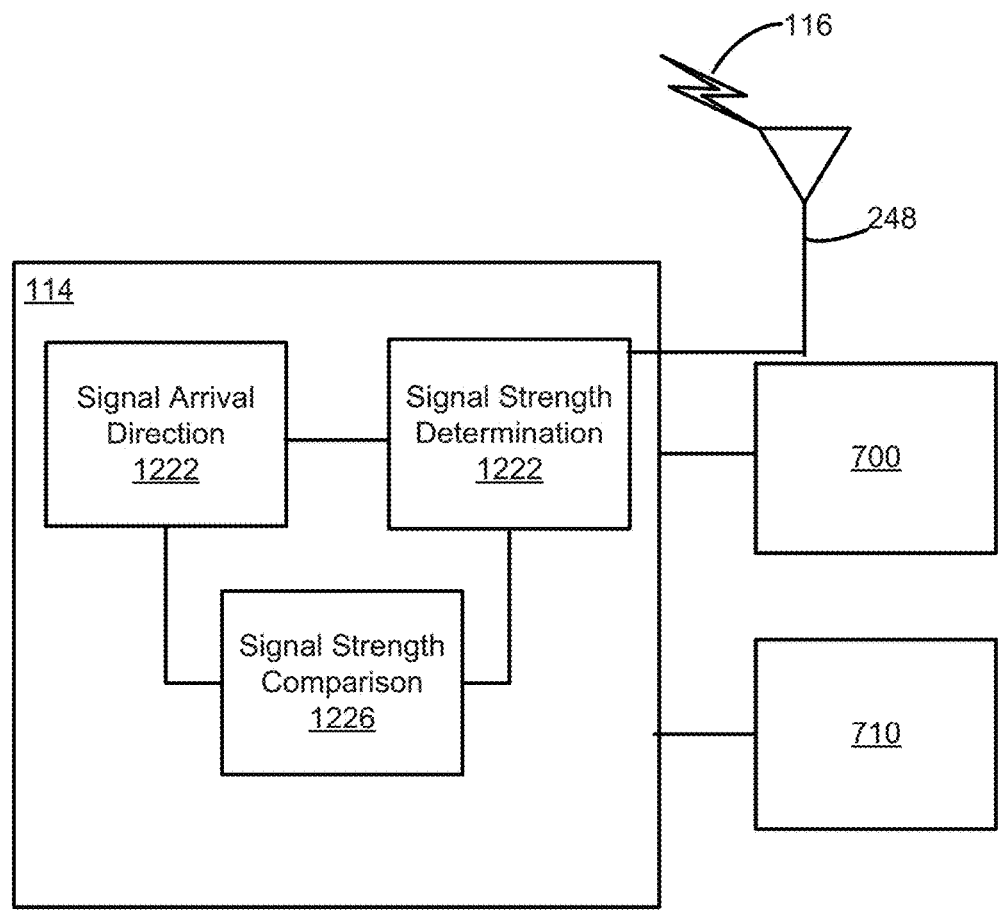
FIG. 12 depicts one embodiment of a base station, which may be used in the wireless network.

FIG. 12 depicts one embodiment of a base station 114, which may be used in the wireless network. Base station 114 has a signal strength determination element 1222, which is configured to measure a strength of a signal transmitted by the mobile wireless communication device 110. Signal arrival direction element 1222 is configured to determine a direction of arrival of a signal from a UE 110, as well as from a mmW AP 105. Signal strength comparison element 1224 is configured to compare the signal strength with reference strengths in either table 700 or 710 to determine directional access information for the mobile wireless communication device 110 to access a selected mmW AP in the table. Elements 1222, 1224, and 1226 may be implemented by processor 240.

Figure 13:
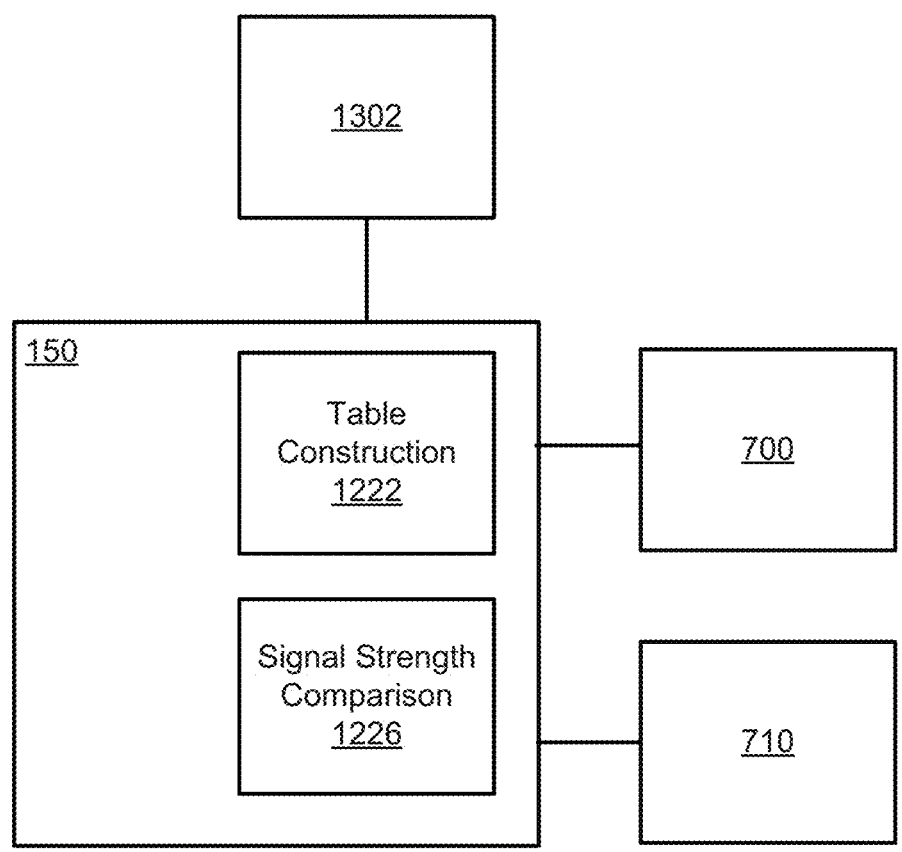
FIG. 13 depicts one embodiment of a computer system, which may be used in the wireless network.

FIG. 13 depicts one embodiment of a computer system 150, which may be used in the wireless network. In one embodiment, the computer system 150 has signal strength comparison element 1224. In one embodiment, the computer system 150 has a table construction element 1322 that is configured to build a table that maps reference signal strengths to an angle at which to a mmW AP is located with respect to a reference. In one embodiment, the table construction element 1322 is configured to build a table 1302 of mmW AP 105 locations. Elements 1224 and 1332 may be implemented by processor 252. Tables 710, 700, 1302 could be stored in any of secondary storage 254, ROM 256, or temporarily in RAM 258.

In one embodiment, there is a mobile wireless communication device, comprising a non-transitory memory storage comprising instructions and one or more processors in communication with the memory, wherein the one or more processors execute the instructions to perform the following. The one or more processors receive information that geometrically relates a first base station of a wireless network, a second base station of the wireless network, and a third base station of the wireless network. The information comprises a first angular direction to a millimeter wave access point (mmW AP) from the first base station and a second angular direction from the second base station to the mmW AP. The one or more processors determine a first direction of arrival of a first signal from the first base station. The one or more processors determine a first angle between the first direction of arrival and a second direction of arrival of a second signal from the second base station. The one or more processors determine a second angle between the first direction of arrival and a third direction of arrival of a third signal from the third base station. The one or more processors determine an angular direction from the mobile wireless communication device to the mmW AP, based on the information, the first angle, and the second angle.

One embodiment comprises a non-transitory computer-readable medium storing computer instructions for determining an angular direction from a mobile wireless communication device to a mmW AP. The instructions when executed by one or more processors, perform the following: receive information that geometrically relates a first base station of a wireless network, a second base station of the wireless network, and a third base station of the wireless network, and comprises a first angular direction to a millimeter wave access point (mmW AP) from the first base station and a second angular direction from the second base station to the mmW AP; determine a first direction of arrival of a first signal from the first base station; determine a first angle between the first direction of arrival and a second direction of arrival of a second signal from the second base station; determine a second angle between the first direction of arrival and a third direction of arrival of a third signal from the third base station; determine an angular direction from the mobile wireless communication device to the mmW AP, based on the information, the first angle, and the second angle.

One embodiment comprises a method for determining an angular direction from a mobile wireless communication device to a mmW AP. The method comprises the following steps: receiving information that geometrically relates a first base station of a wireless network, a second base station of the wireless network, and a third base station of the wireless network, and comprises a first angular direction to a millimeter wave access point (mmW AP) from the first base station and a second angular direction from the second base station to the mmW AP; determining a first direction of arrival of a first signal from the first base station; determining a first angle between the first direction of arrival and a second direction of arrival of a second signal from the second base station; determining a second angle between the first direction of arrival and a third direction of arrival of a third signal from the third base station; determining an angular direction from the mobile wireless communication device to the mmW AP, based on the information, the first angle, and the second angle.

One embodiment comprises a non-transitory computer-readable medium storing computer instructions for computing an angular direction from a mobile wireless communication device to a mmW AP. The instructions when executed by one or more processors, perform the following: transmit a signal in response to a request from a wireless network; record an orientation of the mobile wireless communication device when the signal is transmitted; receive information from the wireless network that geometrically relates a first base station in the wireless network with a second base station in the wireless network, and comprises a first angular direction from the first base station to a millimeter wave access point (mmW AP) and a second angular direction from the second base station to the mmW AP; and compute an angular direction from the mobile wireless communication device to the mmW AP based on the information and the orientation of the mobile wireless communication device when the signal was transmitted.

One embodiment comprises a method for computing an angular direction from a mobile wireless communication device to a mmW AP. The method comprises the following steps: transmitting a signal in response to a request from a wireless network; recording an orientation of the mobile wireless communication device when the signal is transmitted; receiving information from the wireless network that geometrically relates a first base station in the wireless network with a second base station in the wireless network, and comprises a first angular direction from the first base station to a millimeter wave access point (mmW AP) and a second angular direction from the second base station to the mmW AP; and computing an angular direction from the mobile wireless communication device to the mmW AP based on the information and the orientation of the mobile wireless communication device when the signal was transmitted.

One embodiment comprises a non-transitory computer-readable medium storing computer instructions for providing a mobile wireless communication device with information to access a millimeter wave access point (mmW AP). The instructions when executed by one or more processors, perform the following: measure a strength of a signal transmitted by the mobile wireless communication device at a set of base stations of the wireless network; access a table having entries, each of which maps reference signal strengths at the set of base stations to directional access information to access a mmW AP for the entry; compare the strengths of the signal from the mobile wireless communication device received at the set of base stations to the table entries in order to determine directional access information for the mobile wireless communication device to access a selected mmW AP in the table; transmit, from the wireless network to the mobile wireless communication device, the directional access information for the mobile wireless communication device to access the selected mmW AP in the table.

One embodiment comprises a method of providing mmW access point (AP) acquisition assistance to a mobile wireless communication device, comprising the following steps: predicting a first line between the mobile wireless communication device and a first base station in a wireless network, based on a first signal transmission between the mobile wireless communication device and the first base station; predicting a second line between the mobile wireless communication device and a second base station in the wireless network, based on a second signal transmission between the mobile wireless communication device and the second base station; accessing geometric information that links the first base station, the second base station, and a mmW AP; and predicting an angular direction from the mobile wireless communication device to the mmW AP based on the first line, the second line, and the geometric information.

One embodiment comprises a method of providing mmW access point (AP) acquisition assistance to a mobile wireless communication device. The method comprises determining a first angle of a signal from the mobile wireless communication device that is received at a first base station in a wireless network with respect to a direction to a second base station in the wireless network; determining a second angle of a signal from the mobile wireless communication device that is received at the second base station with respect to a direction to a first base station; predicting an angular direction from the mobile wireless communication device to the mmW AP based on the first angle, the second angle, and a first angular direction from the first base station to the mmwave AP and a second angular direction from the second base station to the mmW AP; and providing the angular direction from the wireless network to the mobile wireless communication bile device.

One embodiment comprises a method of building a database of locations of mmW access points. The method comprises the following: a) measuring sub-tended angles between pairs of base stations in a wireless network and a mobile wireless communication device that is connected to a mm-wave AP, based on first and second signals from members of each pair of base stations that are received at the mobile wireless communication device; b) measuring an access angle between a signal from one member of the pair and a signal from the mm-wave AP; c) reporting the sub-tended angle for each pair of base stations, and the access angle to a base station in the wireless network; d) determining a possible location of the mobile wireless communication device based on the sub-tended angles; e) repeating said a) through said d) for other mobile wireless communication devices and other mm-wave APs; f) determining a candidate location of a mm-wave AP for pairs of the mobile wireless communication device based on the possible location for the members of the pair and the access angle for the members; and g) selecting a location of a mm-wave AP from the candidate locations.

One embodiment comprises a method of building a database of locations of mmW access points. The method comprises the following a) receiving a signal at a pair of base stations in a wireless network from a mobile wireless communication device that is connected to a mm-wave AP; b) receiving an angular direction to the mm-wave access point from the mobile wireless communication device with respect to one of the base stations; c) determining a first angle of a signal from the mobile wireless communication device that is received at a first member of a pair of the base stations with respect to a direction to a second member of the pair of base stations; d) determining a second angle of a signal from the mobile wireless communication device that is received at the second member of the pair of the base stations with respect to a direction to the first member of the pair; e) determining a possible location of the mobile device based on the first and second angles and locations of the base stations in the pair; f) repeating said a) through said e) for other mobile wireless communication devices and other mm-wave APs; g) determining a candidate location of a mm-wave AP for pairs of the mobile wireless communication devices based on the possible location for the members of the pair and the access angle for the members; and h) selecting a location of a mm-wave AP from the candidate locations.

One embodiment includes a method in a wireless communication network for indicating available mmWave APs in an area, comprising: identifying a first UE and a second UE that is connected to a mmWave AP; requesting uplink transmissions from the first UE and the second UE; receiving the uplink transmissions at a set of base stations in the wireless communication network and measuring the direction of reception of the signal from the first UE at each of the set of base stations and the direction of reception of the signal from the second UE at each of the set of base stations; receiving, from the first UE, the direction of the mmWave AP from the first UE, and from the second UE, the direction of the mmWave AP from the second UE; updating the location of the mmWave AP in a database; and transmitting the location of the mmWave AP to one or more UEs.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile wireless communication device, comprising:
   a non-transitory memory storage comprising instructions; and
   one or more processors in communication with the non-transitory memory storage, wherein the one or more processors execute the instructions to:
   receive information that geometrically relates a set of base stations of a wireless network to each other, and comprises angular directions to a millimeter wave access point (mmW AP) from at least two of the base stations in the set;
   determine a first angle between a first direction of arrival of a first signal from a first base station in the set and a second direction of arrival of a second signal from a second base station in the set;
   determine a second angle between a third direction of arrival of a third signal from a third base station in the set and a fourth direction of arrival of a fourth base station in the set;
   determine an angular direction from the mobile wireless communication device to the mmW AP, based on the information, the first angle, and the second angle; and
   connect to the mmW AP based on the determined angular direction.

2. The mobile wireless communication device of claim 1, wherein the angular direction from the mobile wireless communication device to the mmW AP is a candidate angular direction for two pairs of the base stations, the information geometrically relates other based stations of the wireless network, and comprises angular directions to the mmW AP from the other base stations, wherein the one or more processors execute the instructions to:
   select other two pairs of the base stations from the information;
   determine other candidate angular directions from the mobile wireless communication device to the mmW AP as was done for the pair of the first and second base stations and the pair of the third and fourth base stations; and
   determine a refined angular direction from the mobile wireless communication device to the mmW AP based on the candidate angular directions.

3. The mobile wireless communication device of claim 2, wherein the one or more processors execute the instructions to:
   group the candidate angular directions into clusters of candidate angular directions; and
   select a value in a cluster with the most candidate angular directions as the refined angular direction.

4. The mobile wireless communication device of claim 1, wherein to determine the angular direction from the mobile wireless communication device to the mmW AP the one or more processors execute the instructions to determine one or more candidate locations for the mobile wireless communication device based on the first angle being a first subtended angle and the second angle being a second subtended angle, and further based on the information that geometrically relates the first base station, the second base station, the third base station, and the fourth base station.

5. The mobile wireless communication device of claim 4, wherein the information that geometrically relates the base stations comprises a first distance between the first base station and the second base station, a second distance between the fourth base station and the third base station, wherein the first distance is a first chord associated with the first subtended angle and the second distance is a first second associated with the second subtended angle.

6. The mobile wireless communication device of claim 1, wherein the angular directions from the at least two base stations to the mmW AP are with respect to a reference location to a reference location.

7. The mobile wireless communication device of claim 1, wherein the fourth base station is the same base station as the first base station.

8. The mobile wireless communication device of claim 1, wherein the first signal and the second signal are transmitted at a frequency below 6 GHz.

9. A mobile wireless communication device, comprising:
a non-transitory memory storage comprising instructions; and
one or more processors in communication with the non-transitory memory storage, wherein the one or more processors execute the instructions to:
transmit a signal in response to a request from a wireless network;
receive information from the wireless network that geometrically relates a first base station in the wireless network with a second base station in the wireless network, and comprises a first angular direction from the first base station to a millimeter wave access point (mmW AP) and a second angular direction from the second base station to the mmW AP; and
compute an angular direction from the mobile wireless communication device to the mmW AP based on the information; and
connect to the mmW AP based on the angular direction.

10. The mobile wireless communication device of claim 9, wherein the one or more processors:
record an orientation of the mobile wireless communication device when the signal is transmitted, wherein the one or more processors compute the angular direction further based upon the orientation of the mobile wireless communication device when the signal was transmitted.

11. The mobile wireless communication device of claim 10, wherein to compute the angular direction the one or more processors execute the instructions to:
compensate the angular direction based on a change in orientation of the mobile wireless communication device from the recorded orientation to a present orientation.

12. The mobile wireless communication device of claim 9, wherein the angular direction is a candidate angular direction for the first and second base stations, the information geometrically relates other base stations in the wireless network, and comprises angular directions from the other base stations to the mmW AP, the one or more processors execute the instructions to:
compute other candidate angular directions from the mobile wireless communication device to the mmW AP based on information for other pairs of base stations in the wireless network as was done for the first and second base stations; and
determine a refined angular direction from the mobile wireless communication device to the mmW AP based on the candidate angular directions.

13. The mobile wireless communication device of claim 12, wherein the one or more processors execute the instructions to:
group the candidate angular directions into clusters of candidate angular directions; and
select a mean value in a cluster with the most candidate angular directions as the refined angular direction.

14. The mobile wireless communication device of claim 9, wherein the information that geometrically relates the first base station with the second base station comprises a distance between the first base station and the second base station, wherein the one or more processors execute the instructions to determine a candidate location for the mobile wireless communication device based on the distance between the first base station and the second base station.

15. The mobile wireless communication device of claim 9, wherein the signal is an uplink signal transmitted at a frequency below 6 GHz.

16. A method for determining an angular direction from a mobile wireless communication device to a millimeter wave access point (mmW AP), the method comprising:
receiving information that geometrically relates a set of base stations of a wireless network to each other, and comprises angular directions to the mmW AP from at least two of the base stations in the set;
determining a first angle between a first direction of arrival, at the mobile wireless communication device, of a first signal from a first base station in the set and a second direction of arrival, at the mobile wireless communication device, of a second signal from a second base station in the set;
determining a second angle between a third direction of arrival, at the mobile wireless communication device, of a third signal from a third base station in the set and a fourth direction of arrival, at the mobile wireless communication device, of a fourth base station in the set; and
determining an angular direction from the mobile wireless communication device to the mmW AP, based on the information, the first angle, and the second angle; and
connecting the mobile wireless communication device to the mmW AP based on the determined angular direction.

17. The method of claim 16, wherein the angular direction from the mobile wireless communication device to the mmW AP is a candidate angular direction for two pairs of the base stations, the information geometrically relates other based stations of the wireless network, and comprises angular directions to the mmW AP from the other base stations, wherein the method further comprises:
selecting other two pairs of the base stations from the information;
determining other candidate angular directions from the mobile wireless communication device to the mmW AP as was done for the pair of the first and second base stations and the pair of the third and fourth base stations; and
determining a refined angular direction from the mobile wireless communication device to the mmW AP based on the candidate angular directions.

18. The method of claim 17, further comprising:
grouping the candidate angular directions into clusters of candidate angular directions; and selecting a value in a cluster with the most candidate angular directions as the refined angular direction.

19. The method of claim 16, wherein determining the angular direction from the mobile wireless communication device to the mmW AP comprises:
   determining one or more candidate locations for the mobile wireless communication device based on the first angle being a first subtended angle and the second angle being a second subtended angle, and further based on the information that geometrically relates the first base station, the second base station, the third base station, and the fourth base station.

20. The method of claim 19, wherein the information that geometrically relates the base stations comprises a first distance between the first base station and the second base station, a second distance between the fourth base station and the third base station, wherein the first distance is a first chord associated with the first subtended angle and the second distance is a first second associated with the second subtended angle.

* * * * *